US012481810B2

(12) United States Patent
Menand et al.

(10) Patent No.: US 12,481,810 B2
(45) Date of Patent: Nov. 25, 2025

(54) METHODS AND SYSTEMS FOR BOTTOM HOLE ASSEMBLY SELECTION

(71) Applicant: Helmerich & Payne Technologies, LLC, Tulsa, OK (US)

(72) Inventors: Stephane Menand, Houston, TX (US); Mohamed Mahjoub, Lyons (FR)

(73) Assignee: Helmerich & Payne Technologies, LLC, Tulsa, OK (US)

( * ) Notice: Subject to any disclaimer, the term of this patent is extended or adjusted under 35 U.S.C. 154(b) by 0 days.

(21) Appl. No.: 18/586,120

(22) Filed: Feb. 23, 2024

(65) Prior Publication Data
US 2024/0289523 A1 Aug. 29, 2024

Related U.S. Application Data

(60) Provisional application No. 63/486,801, filed on Feb. 24, 2023.

(51) Int. Cl.
*G06F 30/28* (2020.01)
*E21B 7/04* (2006.01)
*E21B 44/00* (2006.01)

(52) U.S. Cl.
CPC .............. *G06F 30/28* (2020.01); *E21B 7/04* (2013.01); *E21B 44/00* (2013.01); *E21B 2200/20* (2020.05)

(58) Field of Classification Search
CPC . G06F 30/28; E21B 7/04; E21B 44/00; E21B 2200/20
See application file for complete search history.

(56) References Cited

U.S. PATENT DOCUMENTS

2007/0192074 A1 8/2007 Chen
2023/0124120 A1* 4/2023 Yu .......................... G06F 30/20
175/24

FOREIGN PATENT DOCUMENTS

EP 2264275 A2 12/2010
WO 2013083380 A2 6/2013

OTHER PUBLICATIONS

Panayirci et al., "Selection of Optimum Bottom Hole Assembly Configuration Using Steering Prediction Modeling", Journal of Natural Gas Science and Engineering, vol. 27, Nov. 2015, pp. 757-762.
PCT/US2024/017129 , "International Search Report and Written Opinion", May 28, 2024, 12 pages.

* cited by examiner

*Primary Examiner* — Dany E Akakpo
(74) *Attorney, Agent, or Firm* — Kilpatrick Townsend & Stockton LLP

(57) ABSTRACT

A method can include a computing device receiving a drill plan for the borehole. The drill plan can include survey information providing formation information for one or more sections of the borehole. The method can include accessing a plurality of capability data for one or more bottom hole assemblies that may include: a neutral capability score, a steering capacity score, and a sliding ratio score. The method can include determining an overall score for each of the one or more bottom hole assemblies based at least in part on the neutral capability score, the steering capacity score, and the sliding ratio score. The method can include determining, by the computing device, a select bottom hole assembly of the one or more bottom hole assemblies based at least in part on the overall score. The method may include displaying the overall score and an identification of the select bottom hole assembly.

30 Claims, 19 Drawing Sheets

```
┌─────────────────────────────────────────────────────────────────────────┐
│ RECEIVING, BY A COMPUTING DEVICE, A DRILL PLAN FOR THE BOREHOLE, THE DRILL │
│ PLAN COMPRISING FORMATION INFORMATION FOR ONE OR MORE SECTIONS OF THE    │
│                              BOREHOLE                                    │
│                                2105                                      │
└─────────────────────────────────────────────────────────────────────────┘
                                   │
                                   ▼
┌─────────────────────────────────────────────────────────────────────────┐
│  ACCESSING, BY THE COMPUTING DEVICE, DATA CORRESPONDING TO EACH OF A    │
│                         PLURALITY OF BHAs                                │
│                              2110                                        │
└─────────────────────────────────────────────────────────────────────────┘
                                   │
                                   ▼
┌─────────────────────────────────────────────────────────────────────────┐
│  DETERMINING, BY THE COMPUTING DEVICE, AN OVERALL SCORE FOR EACH OF THE │
│   BHAs BASED AT LEAST IN PART ON THE NEUTRAL CAPACITY SCORE, THE STEERING│
│            CAPACITY SCORE, AND THE SLIDING RATIO SCORE                   │
│                              2115                                        │
└─────────────────────────────────────────────────────────────────────────┘
                                   │
                                   ▼
┌─────────────────────────────────────────────────────────────────────────┐
│  DETERMINING, BY THE COMPUTING DEVICE, A SELECT BOTTOM HOLE ASSEMBLY OF │
│   THE ONE OR MORE BOTTOM HOLE ASSEMBLIES BASED AT LEAST IN PART ON THE  │
│                            OVERALL SCORE                                 │
│                              2120                                        │
└─────────────────────────────────────────────────────────────────────────┘
                                   │
                                   ▼
┌─────────────────────────────────────────────────────────────────────────┐
│   DISPLAYING THE OVERALL SCORE AND AN IDENTIFICATION OF THE SELECT BHA  │
│                              2125                                        │
└─────────────────────────────────────────────────────────────────────────┘
```

FIG. 21

METHODS AND SYSTEMS FOR BOTTOM HOLE ASSEMBLY SELECTION

REFERENCE TO RELATED APPLICATION

This application claims the benefit of U.S. Provisional Patent Application No. 63/486,801, filed on Feb. 24, 2023, and entitled METHODS AND SYSTEMS FOR BOTTOM HOLE ASSEMBLY SELECTION, the content of which is hereby incorporated by reference in its entirety.

FIELD OF THE DISCLOSURE

The present disclosure provides systems and methods useful for drilling a well, such as an oil and gas well. The systems and methods can be computer-implemented using processor executable instructions for execution on a processor and can accordingly be executed with a programmed computer system.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

In the oil and gas industry, extraction of hydrocarbon natural resources is done by physically drilling a hole to a reservoir where the hydrocarbon natural resources are trapped. The hydrocarbon natural resources can be up to 10,000 feet or more below the ground surface and be buried under various layers of geological formations. Drilling operations can be conducted by having a rotating drill bit mounted on a bottom hole assembly (BHA) that gives direction to the drill bit for cutting through geological formations and enabled steerable drilling.

SUMMARY

In an aspect, a system for selecting a bottom hole assembly to drill a borehole can include one or more processors configured to: receive, by a computing device, a drill plan for the borehole, the drill plan comprising formation information for one or more sections of the borehole; access, by the computing device, data corresponding to each of a plurality of BHAs comprising: a neutral capability score responsive to the rotary drilling data for the BHA; a steering capacity score responsive to data for a dogleg capability of the BHA; and a sliding ratio score responsive to data for rotary and slide drilling by the BHA; determine, by the computing device, an overall score for each of the BHAs based at least in part on the neutral capability score, the steering capacity score, and the sliding ratio score; determine, by the computing device, a select bottom hole assembly of the one or more bottom hole assemblies based at least in part on the overall score; and display the overall score and an identification of the select BHA.

In various embodiments, the neutral capability score can be determined by plotting a plurality of points of a built rate versus a turn rate for a particular BHA of the BHAs; determining a rotary objective with a predefined tolerance based on the drillplan; and determining a percentage of a number of points of the plurality of points that are within the rotary objective as compared to a total number of points, wherein the neutral capability score comprises the determined percentage.

In various embodiments, the steering score is determined by plotting a plurality of points of a built rate versus a turn rate for a particular BHA of the BHAs; determining a dogleg objective for a target wellbore for the drillplan; and determining a percentage of a number of points of the plurality of points that are within the dogleg objective as compared to a total number of points, wherein the steering score comprises the determined percentage.

In various embodiments, the steering score is adjusted by a width of a sliding envelope.

In various embodiments, the sliding ratio score is determining by plotting a plurality of points of a built rate versus a turn rate for a particular BHA of the BHAs; determining a sliding area objective for a target wellbore for the drillplan; and determining a percentage of a number of points of the plurality of points that are within the sliding area objective as compared to a total number of points, wherein the sliding ratio score comprises the determined percentage.

In various embodiments, the sliding ratio score comprises a total sliding length divided by a total length of all drillable surveys in the plurality of data.

In various embodiments, the overall score for a vertical section or a lateral section of the borehole for the selected bottom hole assembly comprises a product of the neutral score and a rotating ration, the rotating ratio comprising one minus the sliding ratio score.

In various embodiments, the overall score for a curve section of the borehole for the selected bottom hole assembly comprises a product of the steering capacity score and the sliding ratio score.

In various embodiments, the data is generated by simulated drilling operations.

In various embodiments, the data is generated by actual drilling operations.

In various embodiments, the data is a combination of simulated drilling operations data and actual drilling operations data.

In various embodiments, the system includes drilling a borehole using the selected BHA.

In various embodiments, the system includes selecting a first BHA for a vertical portion of the wellbore; selecting a second BHA for a curved portion of the wellbore; and selecting a third BHA for a lateral portion of the wellbore.

In an aspect, a method for selecting a bottom hole assembly (BHA) to drill a borehole can include: receiving, by a computing device, a drill plan for the borehole, the drill plan comprising formation information for one or more sections of the borehole; accessing, by the computing device, data corresponding to each of a plurality of BHAs comprising: a neutral capability score responsive to the rotary drilling data for the BHA; a steering capacity score responsive to data for a dogleg capability of the BHA; and a sliding ratio score responsive to data for rotary and slide drilling by the BHA; determining, by the computing device, an overall score for each of the BHAs based at least in part on the neutral capability score, the steering capacity score, and the sliding ratio score; determining, by the computing device, a select bottom hole assembly of the one or more bottom hole assemblies based at least in part on the overall score; displaying the overall score and an identification of the select BHA.

In various embodiments, the neutral capability score is determined by plotting a plurality of points of a built rate versus a turn rate for a particular BHA of the BHAs; determining a rotary objective with a predefined tolerance based on the drill plan; and determining a percentage of a number of points of the plurality of points that are within the rotary objective as compared to a total number of points, wherein the neutral capability score comprises the determined percentage.

In various embodiments, the steering score is determined by plotting a plurality of points of a built rate versus a turn rate for a particular BHA of the BHAs; determining a dogleg objective for a target wellbore for the drillplan; and determining a percentage of a number of points of the plurality of points that are within the dogleg objective as compared to a total number of points, wherein the steering score comprises the determined percentage.

In various embodiments, the steering score is adjusted by a width of a sliding envelope.

In various embodiments, the sliding ratio score is determining by plotting a plurality of points of a built rate versus a turn rate for a particular BHA of the BHAs; determining a sliding area objective for a target wellbore for the drillplan; and determining a percentage of a number of points of the plurality of points that are within the sliding area objective as compared to a total number of points, wherein the sliding ratio score comprises the determined percentage.

In various embodiments, the sliding ratio score comprises a total sliding length divided by a total length of all drillable surveys in the plurality of data.

In various embodiments, the overall score for a vertical section or a lateral section of the borehole for the selected bottom hole assembly comprises a product of the neutral score and a rotating ration, the rotating ratio comprising one minus the sliding ratio score.

In various embodiments, the overall score for a curve section of the borehole for the selected bottom hole assembly comprises a product of the steering capacity score and the sliding ratio score.

In various embodiments, the data is generated by simulated drilling operations.

In various embodiments, the data is generated by actual drilling operations.

In various embodiments, the data is a combination of simulated drilling operations data and actual drilling operations data.

In various embodiments, the method further includes drilling a borehole using the selected BHA.

In various embodiments, the method further includes selecting a first BHA for a vertical portion of the wellbore; selecting a second BHA for a curved portion of the wellbore; and selecting a third BHA for a lateral portion of the wellbore.

In various embodiments, the method further includes drilling a borehole using the selected BHA; tripping out a drillstring from the borehole; selecting a second BHA for drilling the borehole; replacing the selected BHA with the second BHA on the drillstring; and drilling the borehole using the second BHA.

In an aspect, a non-transitory computer-readable medium storing a set of instructions for selecting a bottom hole assembly (BHA) to drill a borehole, the set of instructions include one or more instructions that, when executed by one or more processors of a device, cause the device to: receive, by a computing device, a drill plan for the borehole, the drill plan comprising formation information for one or more sections of the borehole; access, by the computing device, data corresponding to each of a plurality of BHAs comprising: a neutral capability score responsive to the rotary drill data for the BHA; a steer capacity score responsive to data for a dogleg capability of the BHA; and a slide ratio score responsive to data for rotary and slide drilling by the BHA; determine, by the computing device, an overall score for each of the BHAs based at least in part on the neutral capability score, the steering capacity score, and the sliding ratio score; determine, by the computing device, a select bottom hole assembly of the one or more bottom hole assemblies based at least in part on the overall score; and display the overall score and an identification of the select BHA.

In various embodiments, the neutral capability score is determined by plotting a plurality of points of a built rate versus a turn rate for a particular BHA of the BHAs; determining a rotary objective with a predefined tolerance based on the drillplan; and determining a percentage of a number of points of the plurality of points that are within the rotary objective as compared to a total number of points, wherein the neutral capability score comprises the determined percentage.

In various embodiments, the neutral capability score comprises the determined percentage.

In various embodiments, the steering score is determined by plotting a plurality of points of a built rate versus a turn rate for a particular BHA of the BHAs; determining a dogleg objective for a target wellbore for the drillplan; and determining a percentage of a number of points of the plurality of points that are within the dogleg objective as compared to a total number of points, wherein the steering score comprises the determined percentage.

In various embodiments, the steering score is adjusted by a width of a sliding envelope.

In various embodiments, the sliding ratio score is determining by plotting a plurality of points of a built rate versus a turn rate for a particular BHA of the BHAs determining a sliding area objective for a target wellbore for the drillplan; and determining a percentage of a number of points of the plurality of points that are within the sliding area objective as compared to a total number of points, wherein the sliding ratio score comprises the determined percentage.

In various embodiments, the sliding ratio score comprises a total sliding length divided by a total length of all drillable surveys in the plurality of data.

In various embodiments, the overall score for a vertical section or a lateral section of the borehole for the selected bottom hole assembly comprises a product of the neutral score and a rotating ration, the rotating ratio comprising one minus the sliding ratio score.

In various embodiments, the overall score for a curve section of the borehole for the selected bottom hole assembly comprises a product of the steering capacity score and the sliding ratio score.

In various embodiments, the data is generated by simulated drilling operations.

In various embodiments, the data is generated by actual drilling operations.

In various embodiments, the data is a combination of simulated drilling operations data and actual drilling operations data.

In various embodiments, the operations further include drilling a borehole using the selected BHA.

In various embodiments, the operations further include selecting a first BHA for a vertical portion of the wellbore; selecting a second BHA for a curved portion of the wellbore; and selecting a third BHA for a lateral portion of the wellbore.

BRIEF DESCRIPTION OF THE DRAWINGS

For a more complete understanding of the present invention and its features and advantages, reference is now made to the following description, taken in conjunction with the accompanying drawings, in which:

FIG. 21 illustrates a flowchart for a method for selecting a bottom hole assembly.

DESCRIPTION

Figure 1:
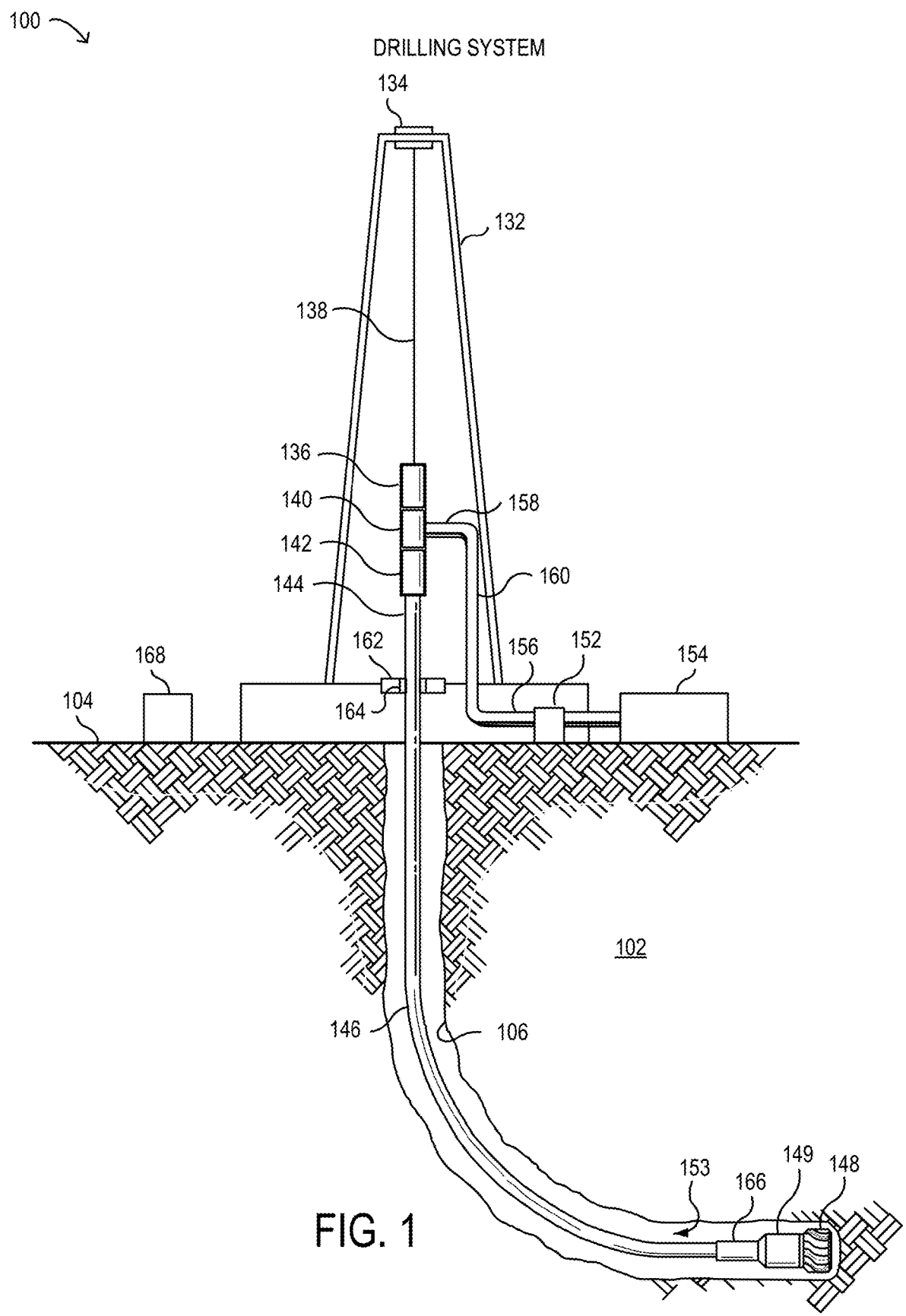
FIG. 1 is a depiction of a drilling system for drilling a borehole.

In the following description, details are set forth by way of example to facilitate discussion of the disclosed subject matter. It is noted, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes because drilling errors can add significant cost to drilling operations. In some cases, drilling errors may permanently lower the output of a well, resulting in substantial long term economic losses due to the lost output of the well.

Therefore, the well plan may be updated based on new stratigraphic information from the wellbore, as it is being drilled. This stratigraphic information can be gained on one hand from measurement while drilling (MWD) and logging while drilling (LWD) sensor data, but could also include other reference well data, such as drilling dynamics data or sensor data giving information, for example, on the hardness of the rock in individual strata layers being drilled through.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a travelling block 136 is coupled via a drilling line 138. In drilling system 100, a top drive 140 is coupled to travelling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the rate of penetration (ROP) or the radial orientation of the tool face, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as tool face and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). In some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149 that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling hub 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steering control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to drilling rig 210, in order to achieve the desired results, which are indicated in the feedback information. The output information generated by steering control system 168 may include indications to modify one or more drilling parameters, the direction of drilling, and the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
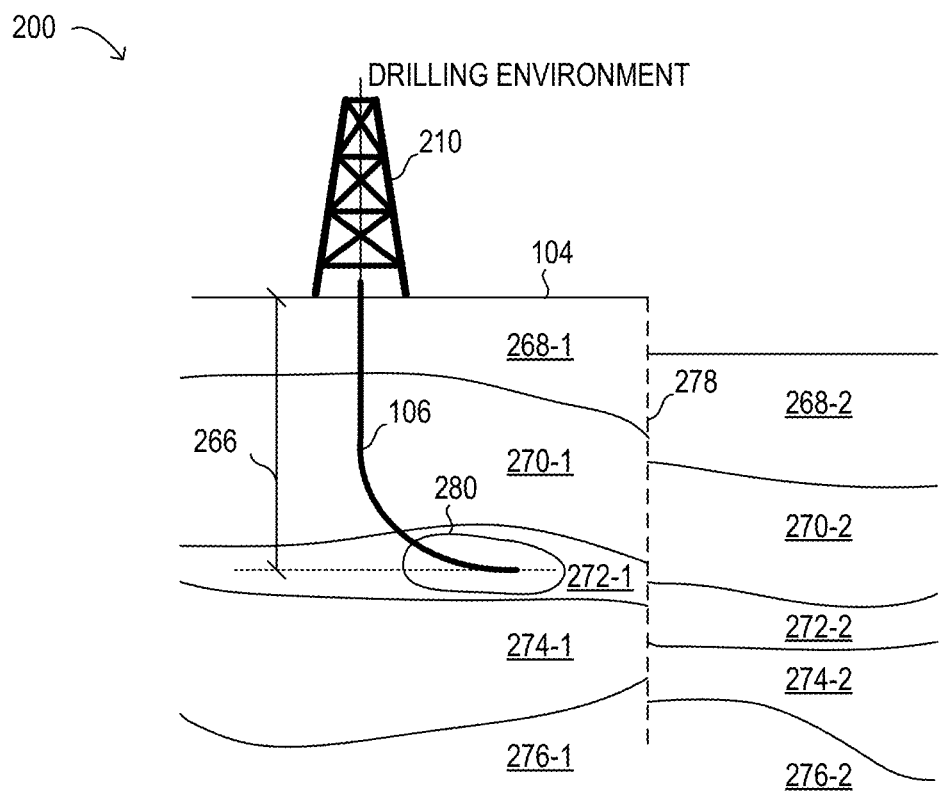
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of drill string 146.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-2, 272-2, 274-2, and 276-2 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used to alter an angle of borehole 106 to accommodate subterranean faults, such as indicated by fault line 278 in FIG. 1. Other benefits that may be achieved using directional drilling include sidetracking off of an existing well to reach a different target area or a missed target area, drilling around abandoned drilling equipment, drilling into otherwise inaccessible or difficult to reach locations (e.g., underpopulated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 272. As such, directional drilling may involve multiple vertical adjustments that complicate the trajectory of borehole 106.

Figure 3:
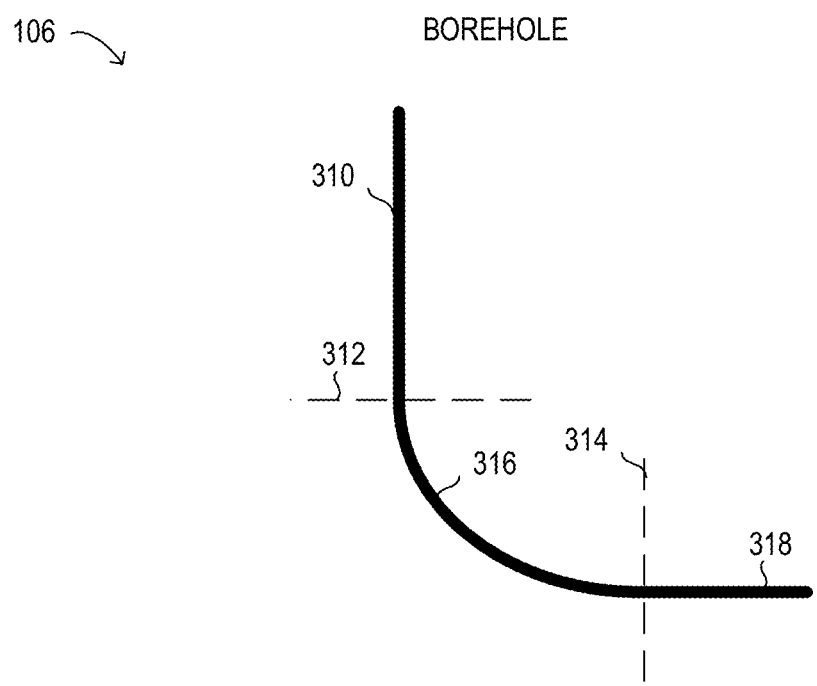
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination angle in buildup section 316 per measured length drilled is referred to herein as a "build rate" and may be defined in degrees per one hundred feet drilled. For example, the build rate may have a value of 6°/100 ft., indicating that there is a six degree Change in inclination angle for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination angle, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and re-drilled along a different path. Such mistakes may be undesirable due to the additional time and expense involved. However, if the built rate is too cautious, additional overall time may be added to the drilling process because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding," are commonly used to form borehole 106. Rotating, also called "rotary drilling," uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of drill string 146. Instead, the mud motor uses hydraulic power derived from the pressurized drilling mud that circulates along borehole 106 to and from the surface 104 to directionally drill borehole 106 in buildup section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating drill string 146 again. The rotation of drill string 146 after sliding may neutralize the directional deviation caused by the bend in the mud motor due to the continuous rotation around a centerline of borehole 106.

Figure 4:
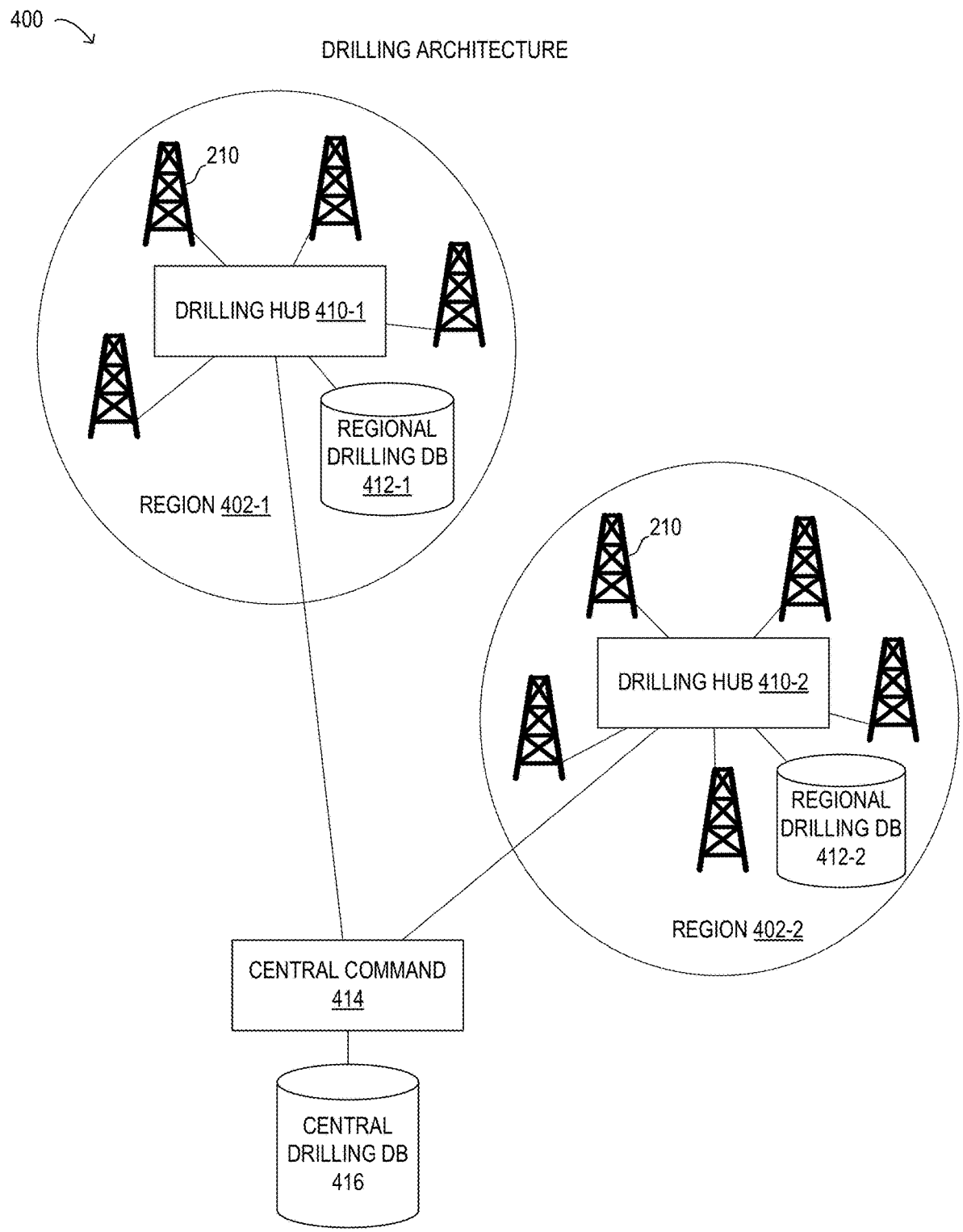
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 402-1, a drilling hub 410-1 may serve as a remote processing resource for drilling rigs 210 located in region 402-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 402-2, a drilling hub 410-2 may serve as a remote processing resource for drilling rigs 210 located in region 402-2, which may vary in number and are not limited to the exemplary schematic illustration of FIG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
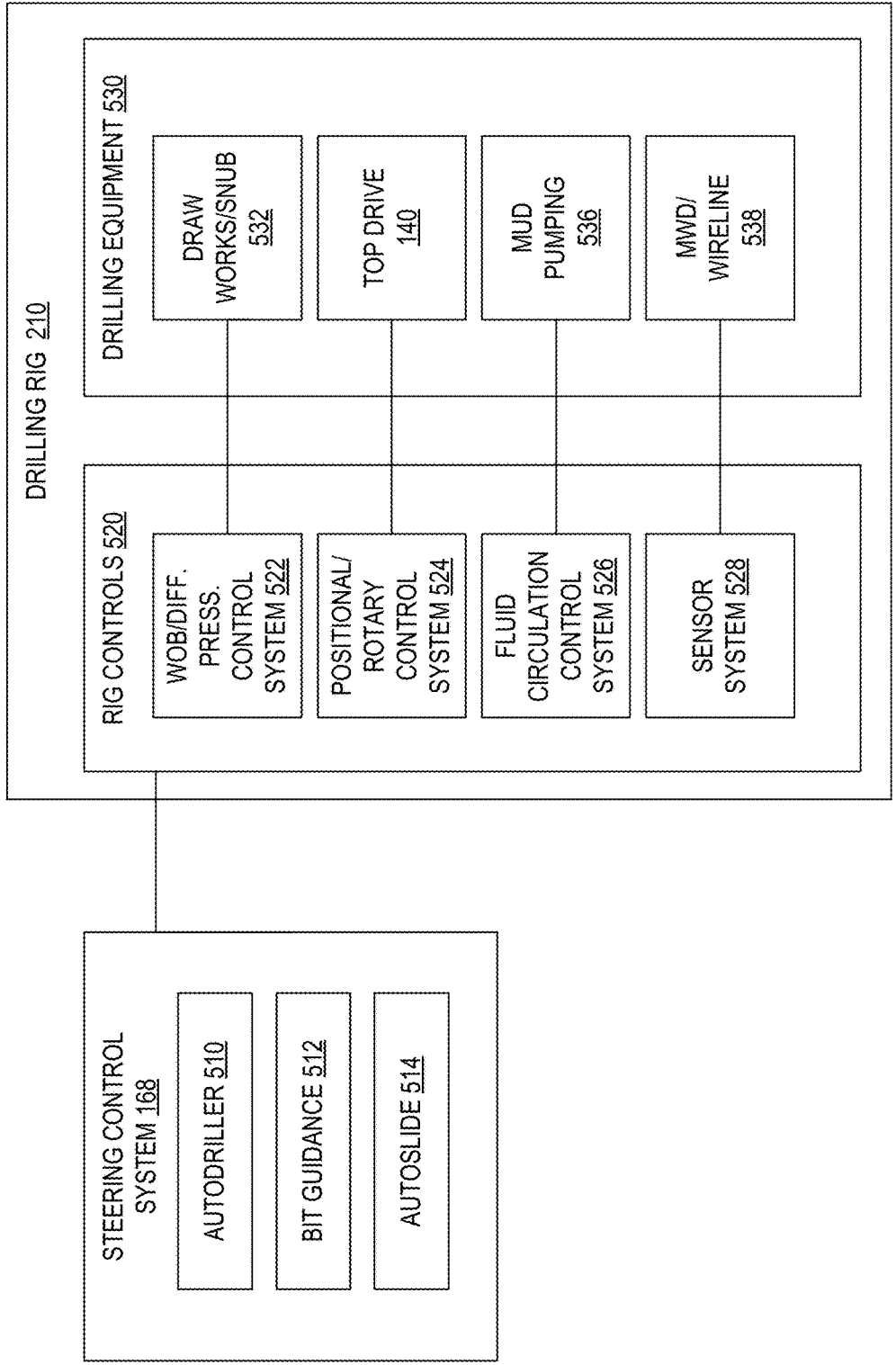
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and an MWD/wireline 538.

Figure 10:
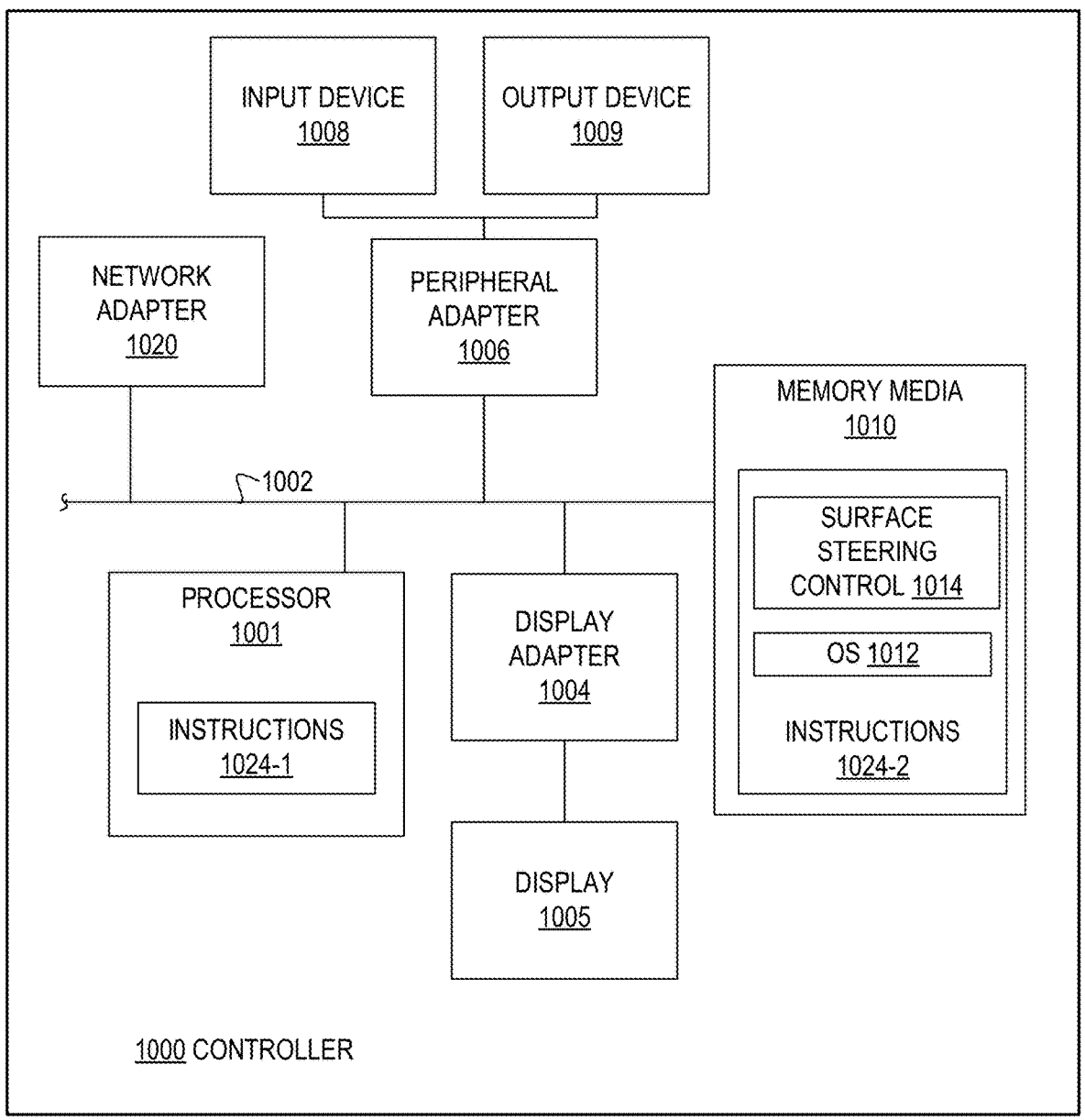
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with MWD/wireline 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

Figure 6:
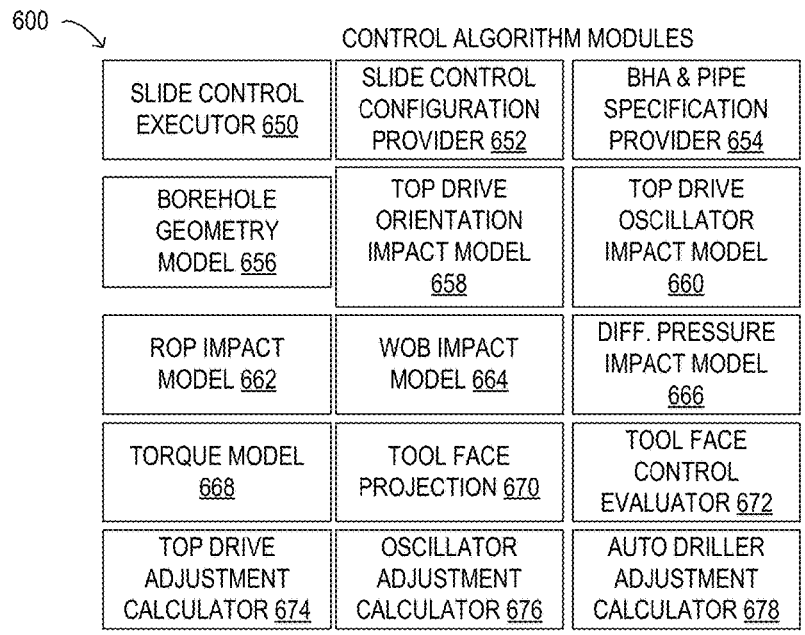
FIG. 6 is a depiction of algorithm modules used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

Figure 7:
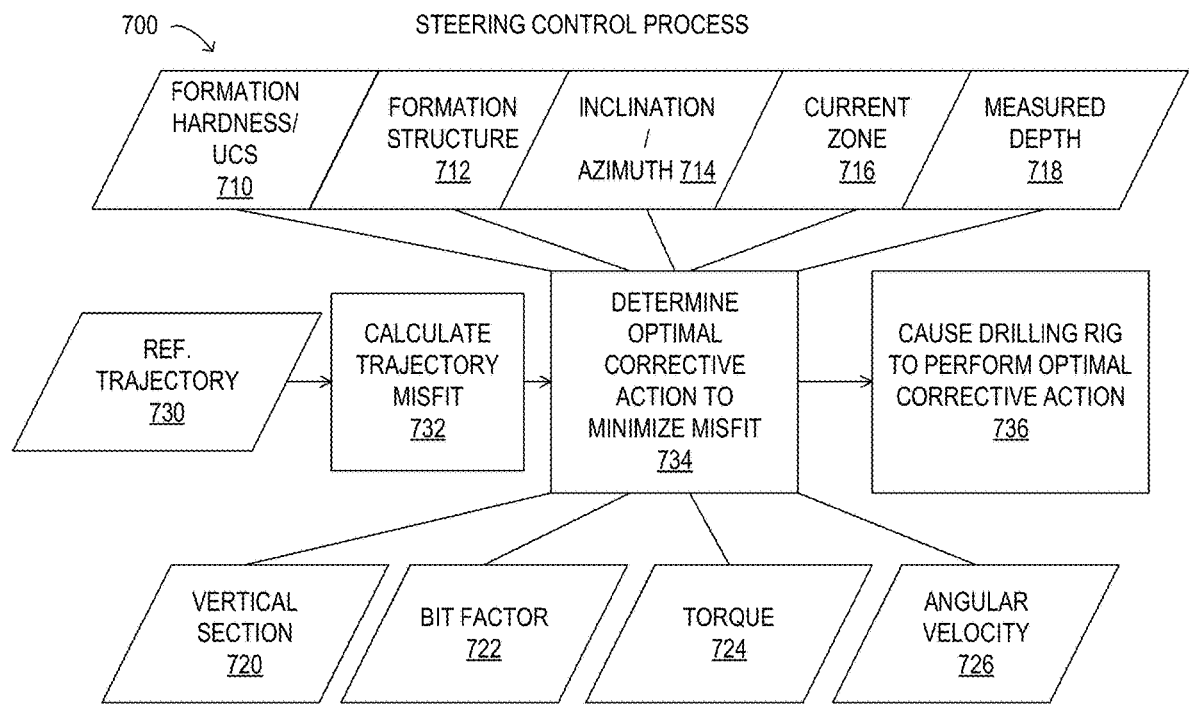
FIG. 7 is a depiction of a steering control process used by the rig control systems.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
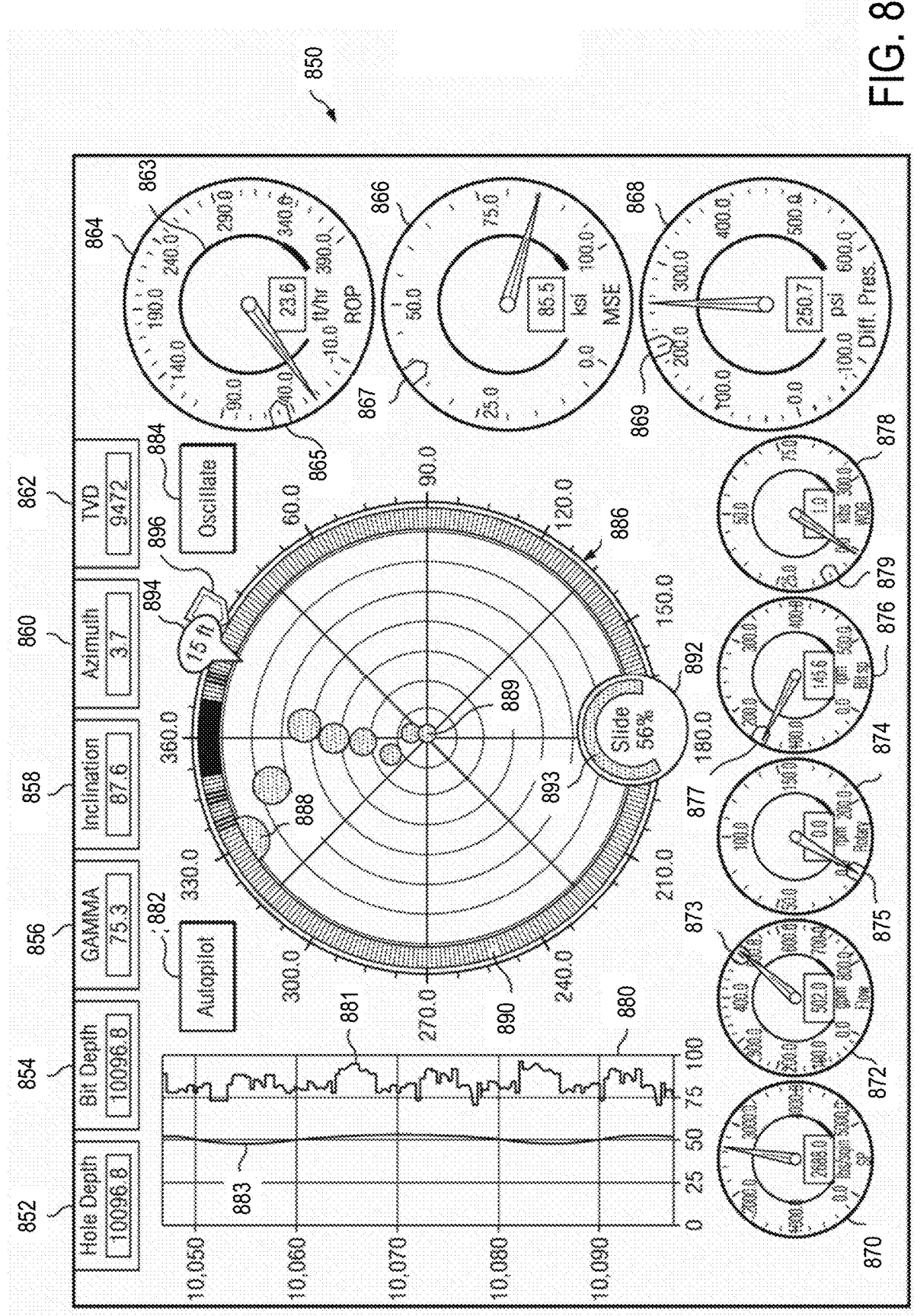
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 kilopounds per square inch (ksi) (or 255 MPa). Differential pressure indicator 868 may include a marker 869 indicating that the target value is 200 psi (or 1.38 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gallons per minute (gpm) (or 31.5 L/s). Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 kilopounds (klbs) (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
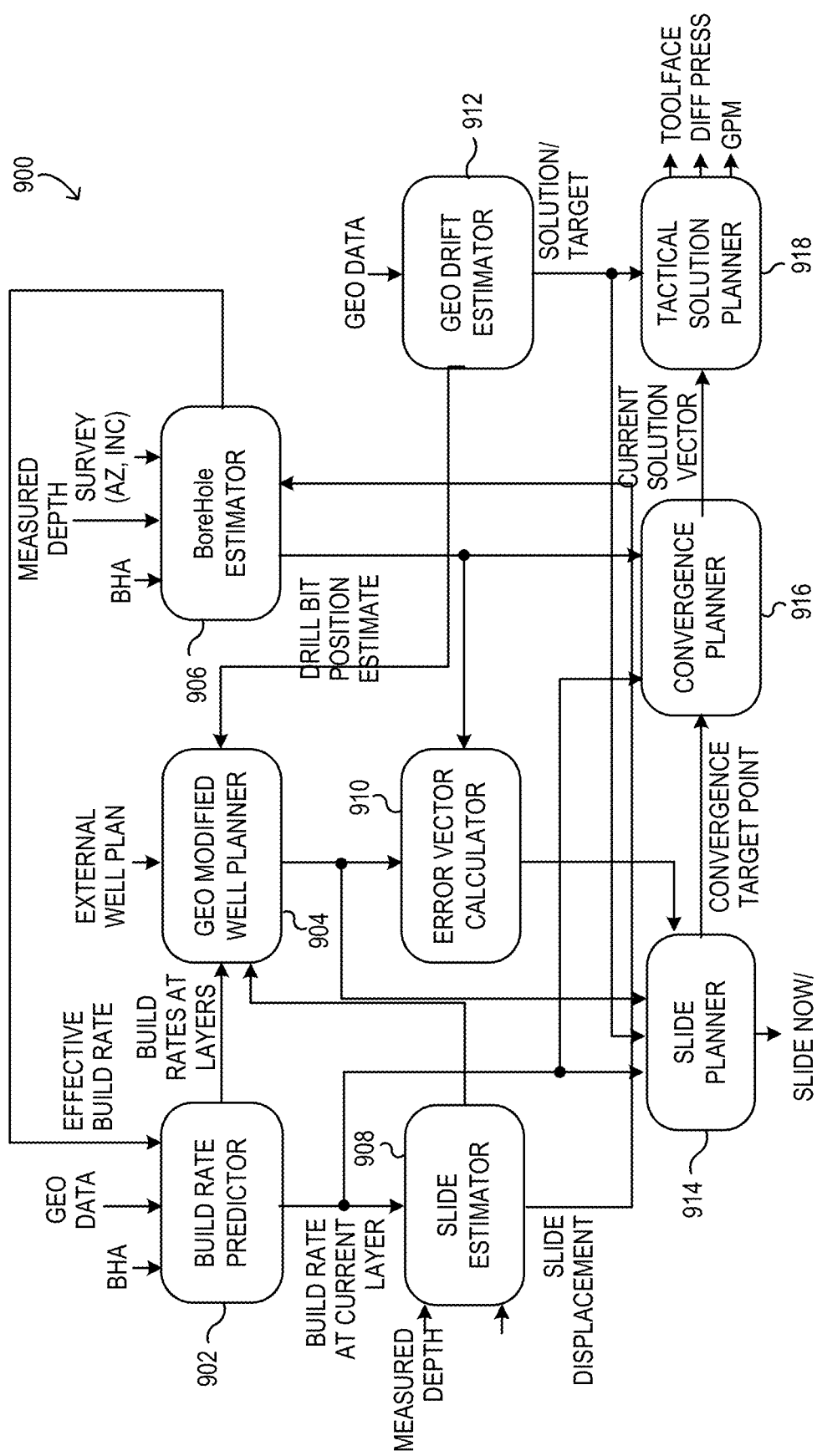
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization, and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination angle as a set point for steering control system 168 to control. For example, the geologist may enter a target to steering control system 168 of 90.5-91.0 degrees of inclination angle for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth angle and inclination angle), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in drill string 146. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steering according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

The following disclosure explains additional and improved methods and systems for drilling. In particular, the following systems and methods can be useful to score various bottom hole assembly possibilities and select a bottom hole assembly for drilling a well that should best achieve drilling the wellbore as desired and planned. It should be noted that the following methods may be implemented by a computer system such as any of those described above. For example, the computer system used to perform the methods described below may be a part of the steering control system 168, a part of the rig controls system 500, a part of the drilling system 100, included with the controller 1000, or may be a similar or different computer system and may be coupled to one or more of the foregoing systems. The computer system may be located at or near the rig site, or may be located at a remote location from the rig site, and may be configured to transmit and receive data to and from a rig site while a well is being drilled. Moreover, it should be noted that the computer system and/or the control system for controlling the variable weight or force may be located in the BHA or near the bit. It is also to be noted that the following methods and systems may be used before drilling begins and/or during drilling of a wellbore, especially if a well plan changes or drilling conditions are not as expected once drilling of a well has begun.

BHA Selection

Geological formations can be modeled based on, among other things, survey information. The survey information can be used in developing a drill plan to access various underground resources. Software models can model various bottom hole assemblies (BHAs) and their performance in various situations based on BHA characteristics. Each of the potential BHAs can be scored based on performance characteristics. The performance characteristics may be determined based on performance data for a particular BHA or type of BHA, or may be determined based on predicted performance, or may be modeled based on a combination of past performance data and anticipated performance information. A wellbore may have three main sections such as a vertical section, a curved section, and a lateral section. In various wells, a different BHA may be used for each of the different sections of the wellbore, and/or for other sections or portions of the wellbore. In various wells, the same BHA may be used for one or more different sections of the well.

Systems and methods described herein provide a way to quickly select the best BHA to drill that well, and/or various sections or portions of the well, as efficiently as possible. In some situations, a BHA may be used to drill a first well, and data from the drilling operations of that well with that BHA can be gathered and stored in a database and can provide information to a computer system. The drill selection software on the computer system can then make recommendations for drilling the next section or portion of the well or for drilling a second well (or portion or section of a second well). A methodology has been developed to select the best BHA to drill various sections of a well, including a Vertical/Slant section, a Curve section, and a Lateral section, using a computer program (which may use some or all of the features described in the "BHA model"="3D-rock-bit-BHA model" as described in US Pat. Pub. No. 2020/0149386 A1, which is hereby incorporated by reference). The method may include running many computations on possible BHA candidates and then recommend one BHA for selection that has the highest Overall Score as determined by the software. Each of the BHAs so evaluated can receive a total score. The total score can include one or more sub-scores. The one or more sub-scores can include a neutral capability score, a steering capability score, and a sliding ratio score.

The neutral capability score can be an important score for the BHA, especially for the horizontal part of a well, the lateral section. Ideally, a BHA can be designed so the BHA does not build or drop during drilling operations in rotating mode (in opposition to sliding mode). Ideally, the BHA is designed such that it drills horizontal 90 degrees all the time. In this embodiment, the BHA provides a weight on bit. For horizontal rotary drilling, the operator does not steer the BHA.

The neutral capability score can express how likely can a BHA respect a prescribed rotary objective with a given tolerance. For example, in the lateral section of a well, an operator would be interested to examine the probability that the BHA will drill a straight line, the rotary objective being Build Rate (BR)=0 deg/100 ft and Turn Rate (TR)=0 deg/100 ft. One computation using the BHA model (given some parameters: bit steerability (BS), walk angle (WALK), over-gage (OVG) borehole, weight-on-bit (WOB), coefficient of friction (FF), WALK—such as disclosed in US Pat. Pub. No. 2020/0149386 A1 which is hereby incorporated by reference) will produce one result "Build Rate and Turn Rate", corresponding to one data point (indicated by a star in the plots shown in FIG. 11). Various data points can be illustrated and plotted because the 4 parameters above can be varied for each given BHA in a given section of the well (e.g., a vertical/slant section, or a curve section, or a lateral section).

The rotary BR results (coming from the "BHA model") can be accounted differently, whether these results fall inside or outside the rotary objective. The further a result is from the rotary objective, the smaller is its contribution to the final score. Moreover, the score can be further penalized with the average rotary result in such a way that if the average is outside the rotary objective, then the final score is reduced. To better understand this score, the following examples show comparisons between situations and the expected order of scores.

Figure 11:
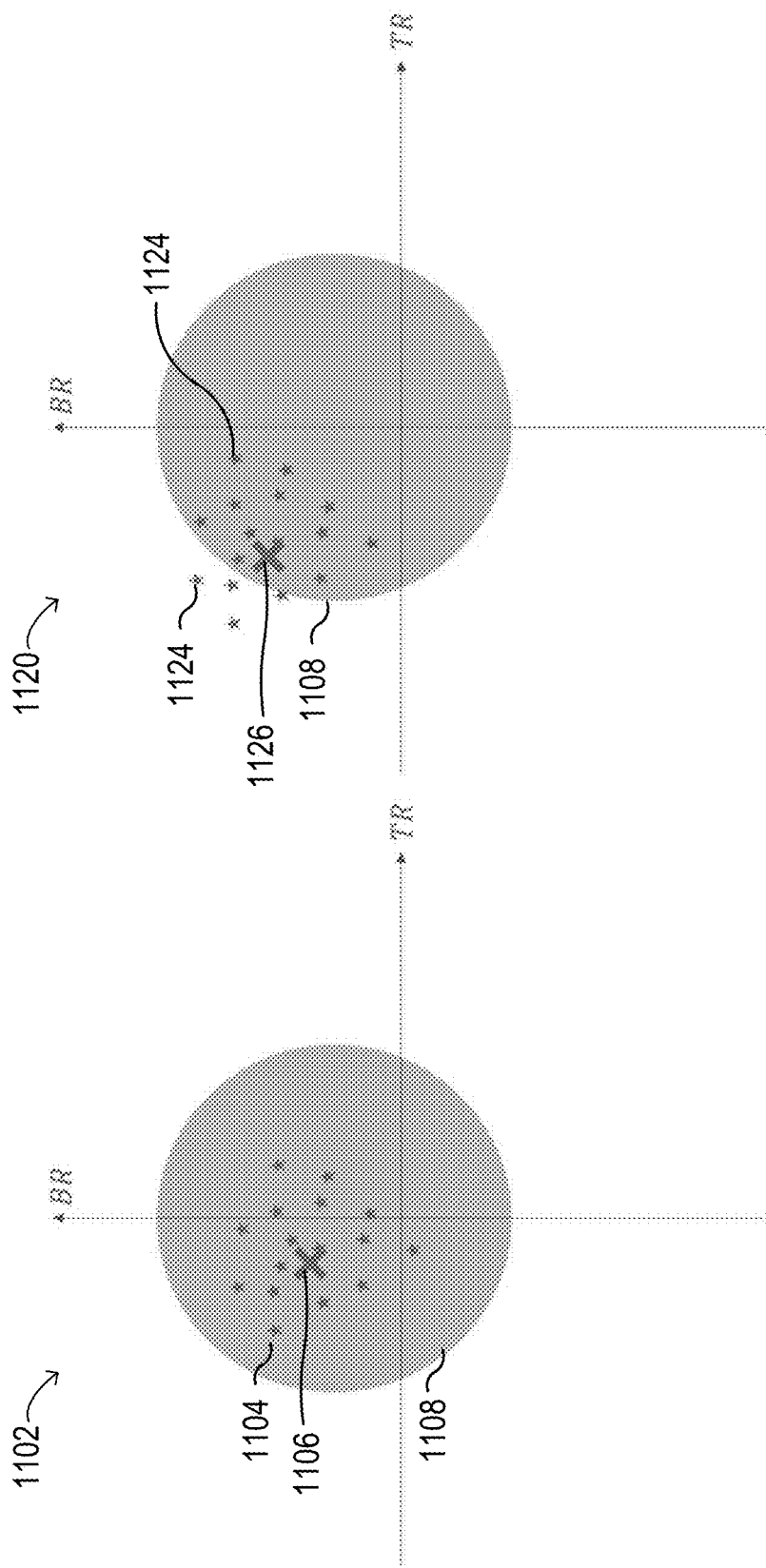
FIG. 11 illustrates two charts of build rate (BR) versus turn rate (TR) for determining a neutral capability score for a method of selecting a bottom hole assembly.

FIG. 11 illustrates two charts of build rate (BR) versus turn rate (TR). BR can be the degree that the BHA will build (rise) or drop (fall) during horizontal drilling operations. Under ideal conditions, an optimum BHA may theoretically have a BR of zero (e.g., no rise and no drop) during horizontal drilling. The TR can be a measurement of how much the BHA turns to the left or the right during horizontal rotary drilling. Under ideal conditions, an optimum BHA may theoretically have a TR of zero (e.g., no left or right turns) during rotary horizontal drilling. An ideal BHA would have points at the origin of the BR vs. TR graph, or have both a BR of zero and a TR of zero.

Inside vs. outside the rotary objective: In the example illustrated in FIG. 11, the results can be represented with a star, their average with a cross, and the rotary objective is indicated as the circle. In a first plot 1102, all the points (and their average) are inside the rotary objective, so the expected score is 100%. In the second plot 1120, some of the points are outside the rotary objective circle, so the score is reduced.

In a first plot 1102 of a first BHA, the combined BR and TR points 1104 can be depicted. The BR and TR points 1104 can represent a model of the BHA performance under varying conditions (e.g., varying weight-on-bit, rate of penetration, mud weights, differential pressure, temperature, depth, friction, and geological formation characteristics), and/or can be based on actual performance data of the BHA, such as from drilling of a prior well. Each BR and TR point 1104 can represent a different calculation. For each of the BR and TR points 1104, different parameters will be varied. There can be many calculated points to run a sensitivity analysis to see changes from the parameter changing from a mean value to a maximum value. The system can run many different parameters to anticipate all potential results of a BHA during horizontal drilling. This can result in a cloud of points. In various cases, the cloud of points can include 200 to 300 calculations. The few points depicted in the first plot 1102 is merely exemplary. After a defined number of calculations have been performed, the system can calculate an average point 1106. An average point 1106 is illustrated in the first plot 1120. In various embodiments, the average point 1106 can be illustrated with an "X". The average point 1106 can be used to determine the neutral capability score for the first BHA.

The rotary objective 1108 can represent the desired threshold limits of BR and TR. The radius of the rotary objective 1108 can correspond to the uncertainty of drilling the borehole to zero build rate and zero turn rate. Under various conditions it would be desirable for all the points of the cloud of points would be within the rotary objective 1108. In various embodiments, the neutral capability score can be reduced by the number of BR and TR points 1104 that fall outside the rotary objective 1108. In various embodiments, a penalty score can be calculated. The penalty score can be a percentage of total points outside the rotary objective 1108. For example, if 10 points out of 100 total points are outside the rotary objective 1108, the penalty can be 10%.

In a second plot 1120 in FIG. 11, the combined BR and TR points 1124 for a second BHA are depicted. Similar to the first plot 1102, the BR and TR points 1124 of the second plot 1120 can represent a model of the BHA performance under varying conditions (e.g., varying weight-on-bit, rate of penetration, mud weights, differential pressure, temperature, depth, friction, and geological formation characteristics). Each BR and TR point 1124 can represent a different calculation. For each of the BR and TR points 1124, parameters will vary. There can be many calculated BR and TR points 1124 to run a sensitivity analysis to see changes from the parameter changing from a mean value to a maximum value. The system can run many different parameters to anticipate all potential results of a BHA during horizontal drilling. This can result in a cloud of points. In various cases, the cloud of points can include 200 to 300 calculations. The few points depicted in the second plot 1120 is merely exemplary. After a defined number of calculations have been performed, the system can calculate an average point 1126. An average point value 1126 is also illustrated in the first plot 1120. In various embodiments, the average point value 1126 can be illustrated with an "X". The average point value 1126 can be used to determine the neutral capability score for the second BHA.

In various embodiments, actual data points collected from actual drilling for different formations, different drill plans, different boreholes, different environmental conditions, and different BHAs can be entered into the system to predict BHA performance for various drill plans. In various embodiments, the physics-based model can be modified into a hybrid model combining predicted data and actual data points. The data for various BHAs from one or more wells previously drilled by each of the various BHAs can be gathered into a BHA database, which can by coupled to a computer system for use in scoring and selecting a BHA for drilling as disclosed herein.

Figure 12:
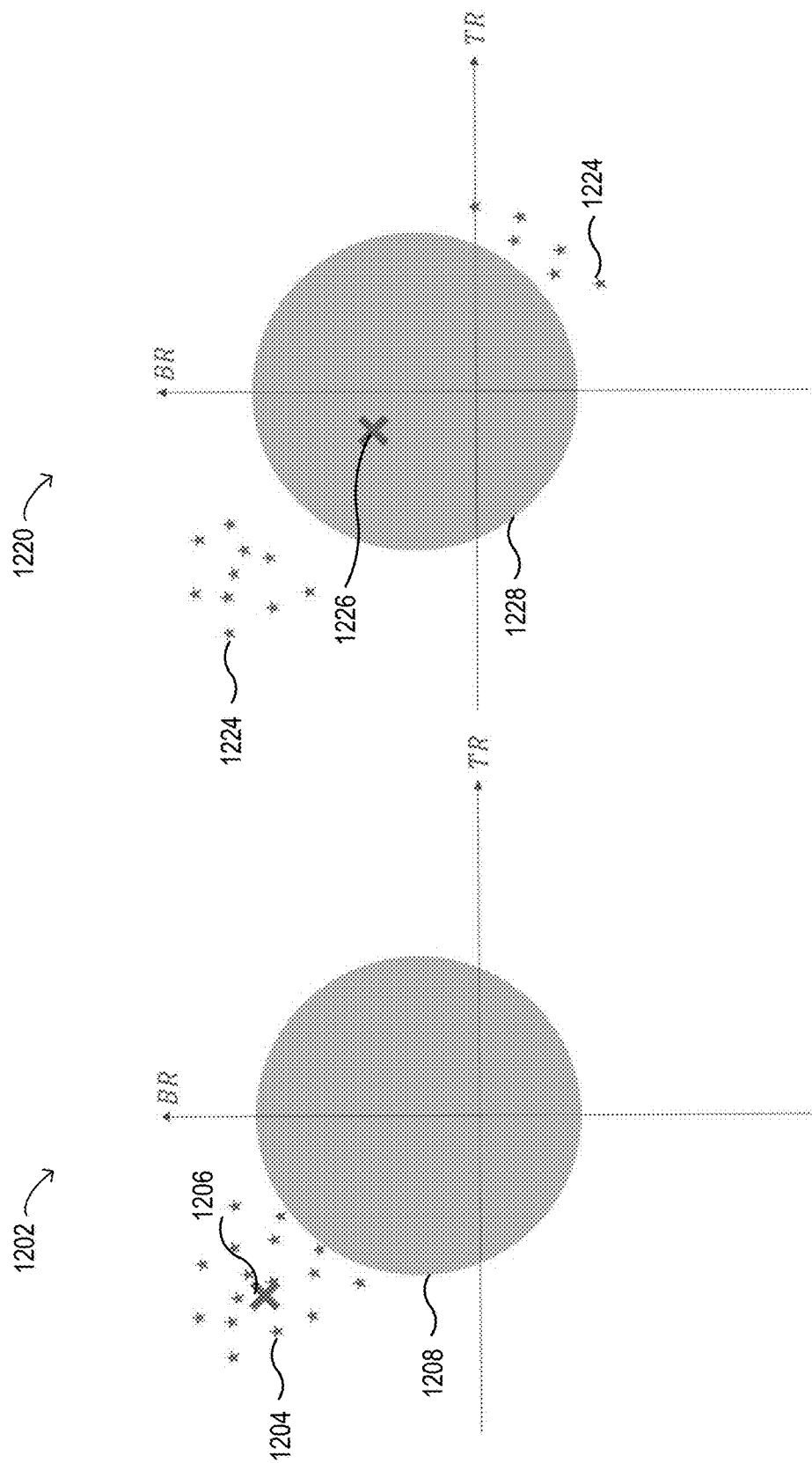
FIG. 12 illustrates various other plots of build rate (BR) versus turn rate (TR) for determining a neutral capability score a method of selecting a bottom hole assembly.

In various embodiments, the predicted values can be adjusted by a correction factor. The correction factor can be determined by comparing the predicted performance and the actual performance on a drilling well. The correction factor can be applied to future wells to be drilled. The correction factor compensates for all uncertainties in the BHA model parameters (bit steerability (BS), walk angle (WALK), overgage (OVG) borehole, weight-on-bit (WOB), coefficient of friction (FF),) and/or other parameters such as rate of penetration, mud weights, differential pressure, temperature, depth, vibrations, and geological formation characteristics FIG. 12 illustrates various other plots of build rate (BR) versus turn rate (TR). In a third plot 1202 it appears that a majority of the BR and TR points 1204 and the average 1206 fall outside the rotary objective 1208.

In the examples illustrated in FIG. 12, all the results are outside the rotary objective circle, but the average is outside the objective on the left plot 1202 and inside the objective on the right-side plot 1220. The score before penalizing with the average value is similar in the two situations, because all points are outside the rotary objective in each case and almost at the same distance to the rotary objective. After penalization, the case on the fourth plot 1220 will have a better score, because the system can consider that it is possible to drill within the rotary objective if the BHA alternates between the two groups of points shown in plot 1220.

The rotary objective 1208 can represent the desired threshold limits of BR and TR. Under various conditions it would be desirable for all the points of the cloud of points would be within the rotary objective 1208. In various embodiments, the neutral capability score can be reduced by the number of BR and TR points 1204 that fall outside the rotary objective 1208.

The third plot 1202 indicates that many of the points are close to the average value 1206, which can be a desirable characteristic of the BHA because it means that the BHA is consistent. However, since all the BR and TR points 1204 for the BHA and the average value 1206 are outside the rotary objective 1208, the BHA would not be ideal for the formation and proposed drill plan.

In a fourth plot 1220, all of the BR and TR points 1224 can be illustrated outside the fourth plot rotary objective 1228. The average value 1226 for the fourth plot 1220 appears with the fourth plot rotary objective 1228. While the average value 1226 can be within the fourth plot rotary objective 1228, the distribution of the BR and TR points 1224 can indicate that the BHA provides inconsistent performance. In this case, the neutral capability score can be reduced because of the number of BR and TR points 1224 that fall outside the rotary objective 1228.

The BHA used for predictions for the fourth plot 1220 may still have utility even though only the average value 1226 was inside the rotary objective 1228. In this case, the driller may use the BHA to build and drop multiple times to achieve the drilling objectives. A preferred condition may exist when many points are inside the rotary objective 1228 and the average value 1226 is also with the rotary objective 1228.

In various embodiments, the system can model the distances between the BR and TR points and determine which BHA is projected to have closer points (e.g., a narrower distribution of the BR and TR data points).

The neutral capability score may be particularly helpful for evaluating the BHA for drilling the lateral section and the slant section of the borehole. Many unconventional wells are vertical and curved, but in the vertical, the wells can sometimes have a tangent in ten or fifteen degrees or so. These tangents can be challenging to drill. In order to keep the BHA at 90 degrees, the drill string can require some kind of stability to offset the attraction of gravity. At ten degrees, the gravity vector does not help stabilize the BHA. The drill string can be too close to vertical. Therefore, drilling a slant section at ten or fifteen degrees Can be challenging. The neutral capability score can be also very useful for evaluating a BHA for a slant section of ten or fifteen degrees.

Figure 13:
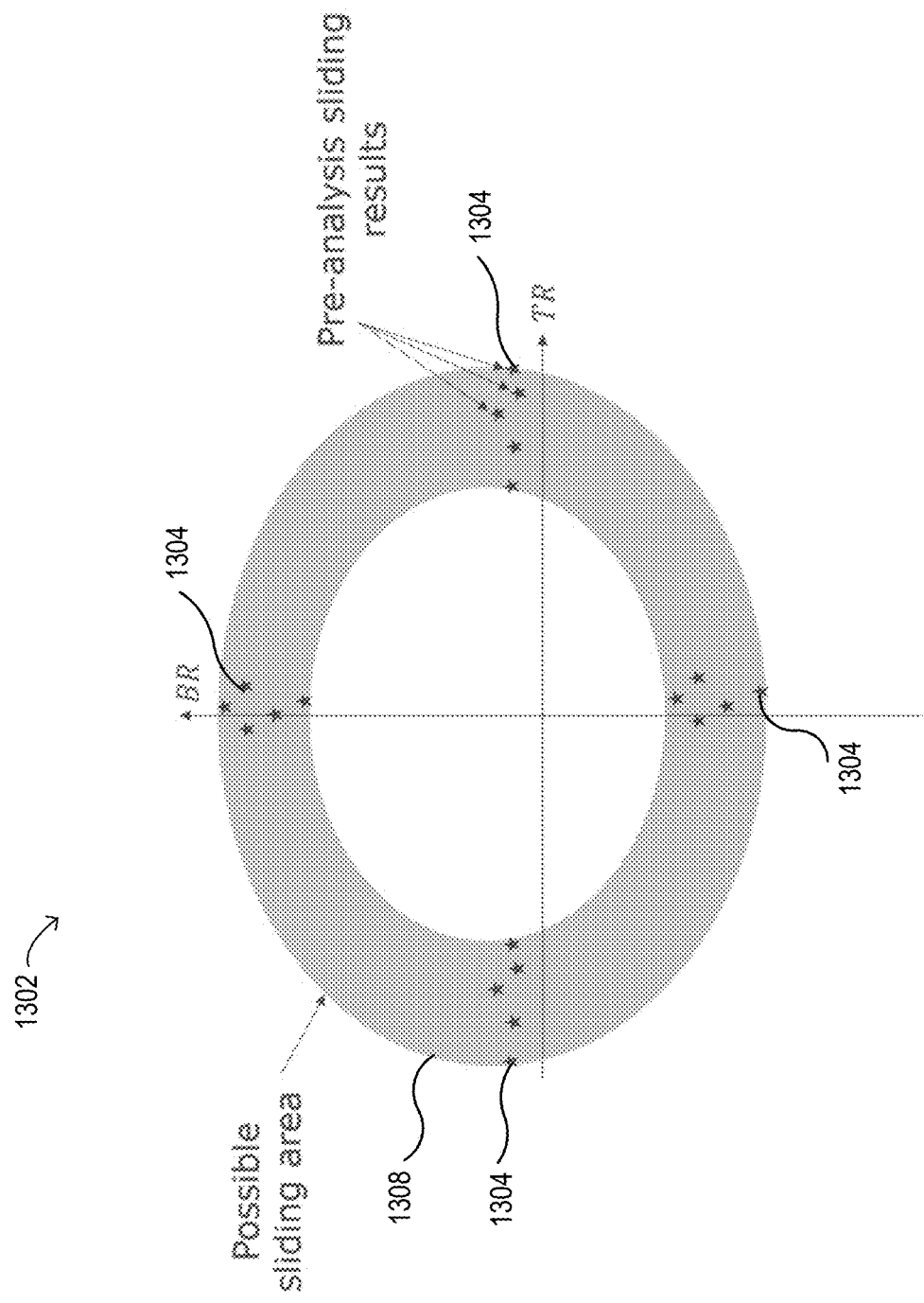
FIG. 13 illustrates a first exemplary plot of BR and TR points to evaluate a steering capacity score of a BHA.

FIG. 13 illustrates an exemplary plot of BR and TR points to evaluate a steering capacity of a BHA. The steering capacity score can be used to express a probability that the BHA can deliver enough dog leg severity to drill the desired wellbore according to a well plan. The steering capacity score can also be used to account for the sensitivity of the BHA towards the operating and environmental properties (WOB, overgage, etc.). First, from the sliding results for a BHA, an envelope 1308 represents the set of all BR and TR points that can be delivered by the BHA. It is obtained by combining the predicted points 1304. The envelope 1308, illustrated in FIG. 13, can provide all the possible curvatures that can be delivered by the BHA for the given range of inputs (e.g., anticipated drilling parameters for the wellbore in accordance with a well plan, or data from the performance of the BHA from one or more previously drilled wells).

The steering capacity score can quantify the ability of a BHA to steer a curved drill path. In a fifth plot 1302 various points are plotted for predicted values of build rate (BR) and turn rate (TR) for a BHA. The envelope 1308 represents the set of all BR and TR points that can be delivered by the BHA. It is obtained by combining the predicted points 1304. For example, if the envelope 1308 predicts possible dogleg severities between nine and eleven degrees per hundred feet then the BHA is projected to likely to steer a ten degrees per hundred feet curve. However, if the planned curve (planned BR and TR points) is outside of the envelope 1308, the BHA is not projected to be able to steer the curve under various conditions and a different BHA may be warranted for the borehole. Each BHA can be more or less sensitive towards the operating and environmental properties. For example, variations of the WOB can lead to plus or minus one degree per hundred feet in the drilled curve. The width (or thickness) of the envelope 1308 can represent the sensitivity of the BHA towards the operating and environmental properties of the rotary steering objective.

For example, for a given curve in a borehole, the BHA can start at zero degrees of inclination and finish at 90 degrees of inclination. The inclination can change as the BHA moves through the curve, so the model can be run at various inclination angles (e.g., 10 degrees, 20 degrees, and 40 degrees, etc.). In various implementations, the calculations can be computed for an average inclination at 45 degrees. FIG. 13 illustrates several groupings of BR and TR points 1304. The groupings correspond to the fact that the tool face orientation might change with a steerable mud motor. The tool face can be, for example, at zero degrees, 90-degrees, 180-degrees, or 270-degrees (as illustrated in FIG. 13) which can correspond to four different tool faces. The example curve in FIG. 13 is to build at ten degrees, but the driller may want to come back with any tool faces, and understand how the BHA will drop, turn to the right, or turn to the left with various tool face orientations. This attribute can be called steering capacity and ideally the envelope large enough to allow the selected BHA to maneuver in the planned well.

Figure 14:
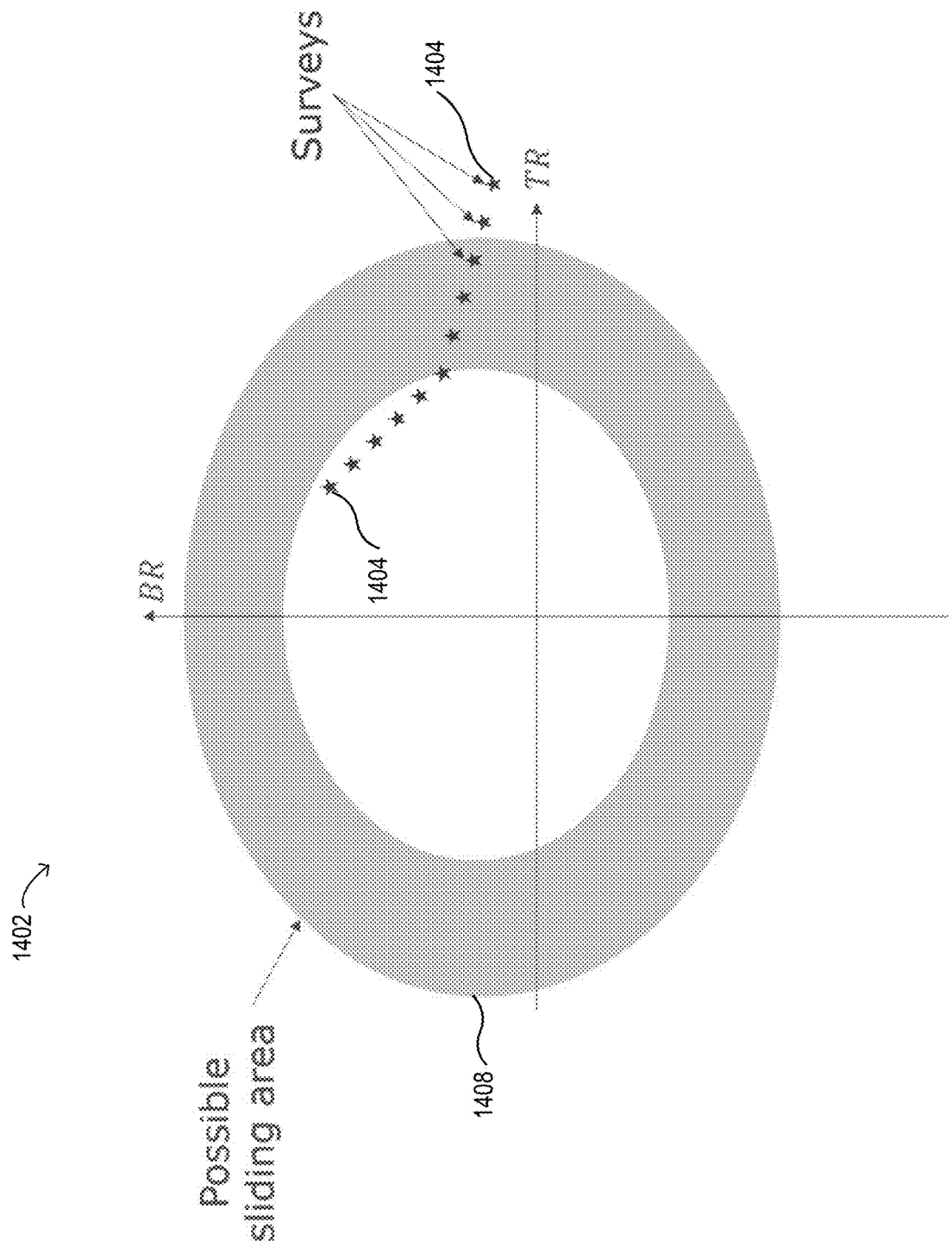
FIG. 14 illustrates a second exemplary plot of BR and TR points to evaluate a steering capacity score of a BHA.

After the envelope 1308 is determined, several data points can be measured. FIG. 14 illustrates an envelope 1408 for a borehole using a drill plan. BR and TR survey points 1404 can be plotted with respect to the envelope 1408. Then, depending on the position of each point with respect to the envelope 1408, the system can decide how likely the borehole would be drillable using the selected BHA. If a BR and TR point 1404 is inside the envelope 1408, then the selected BR and TR point 1404 is considered drillable with 100% confidence. If the BR and TR point 1404 is inside the envelope 1408 the BHA would be drilling in rotating mode, but the BR and TR point 1404 would still be considered drillable. If the BR and TR point is outside the envelope 1408, then the BR and TR point 1404 it is considered unreachable. If it is inside the band of the envelope 1408, then a confidence level between 0 and 100% is assigned to the BR and TR point 1404.

For example, suppose a BHA is capable of drilling 10 degrees per hundred feet. If a BR and TR point is five degrees per hundred feet inside the envelope 1408, the BHA should be able to achieve that point. The variation inside the envelope 1408 can depend on the weight on bit or bit gauge length. The confidence value can vary between 0% confidence outside the envelope 1408 to 100% just inside the width of the envelope 1408. The confidence value can be used to penalize the BHA score if the BHA is too sensitive. For example, if a BHA for the same ranges of weight-on-bit can deliver between five degrees per one hundred feet and ten degrees per one hundred feet the BHA may be too sensitive. A BHA that can deliver between eight and ten degrees per one hundred feet may be considered more consistent. The method and techniques can include an analyzing factor based on sensitivity.

In various embodiments, the steering score can be a percent of survey points 1402 inside the maximum path of the sliding envelope 1404. If the actual and previous points 1402 are inside the envelope 1404, the system can cumulate the length of the wellbore for the points. If both actual and previous data points are outside the envelope, the system can calculate the steering score as zero. If one point is inside and the other is outside, the system can interpolate with the intersected segment and cumulate only a part of the length.

Figure 15:
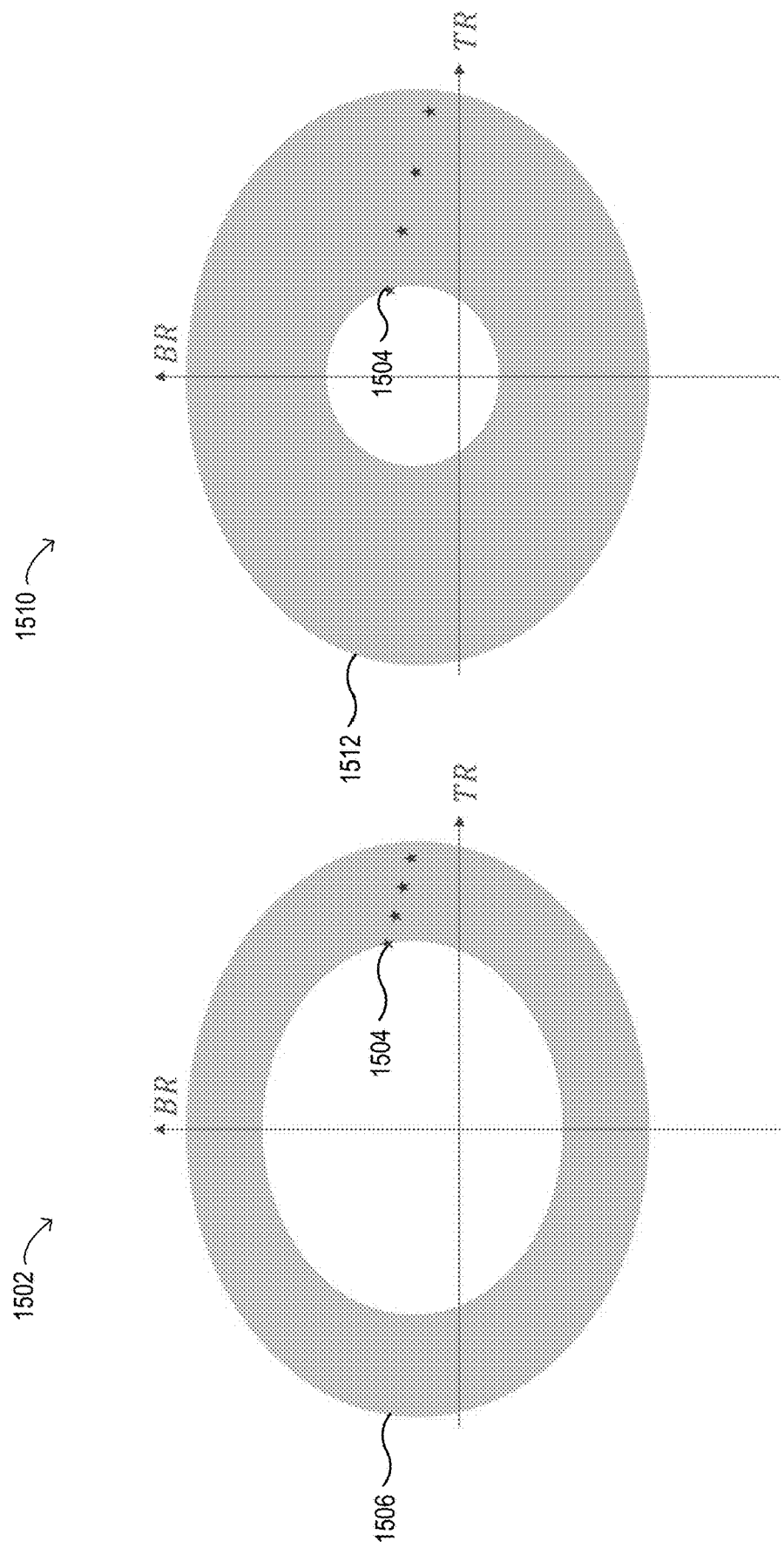
FIG. 15 illustrates a third exemplary plot of BR and TR points to evaluate a steering capacity score of a BHA.

FIG. 15 illustrates changes to the sliding envelope. In order to account for the sensitivity of the BHA towards the operating and environmental properties, the BHA score may be penalized by the width of the sliding envelope. A first plot 1502 illustrates data points 1504 and a first envelope 1506. The example illustrated in FIG. 15 shows two situations where the data points 1504 are in similar positions with respect to the envelopes 1506 and 1512. A second plot 1510 illustrates data points 1504 in a second envelope 1512. The system will provide a better steering capacity score for the first plot 1502 than the second plot 1510 because the width of the first envelope 1506 is smaller than the width of the second envelope 1512.

The computer system can compute or estimate how much slide drilling is needed for a given borehole need and how much rotatory drilling is needed. For a hundred feet, the system can estimate if the BHA can achieve the drilling with all rotating or all sliding or half rotating/half sliding. The results of the BHA model can be indicated inside the envelope 1508 in the lower band. For each section or segment of the wellbore, the system can compute a sliding ratio based on these results. This can be especially true for the curve because typically in the curve, the greater the slide 80% to 60% of the time sliding with a given field, the system can achieve that objective and sometimes the system rotates the BHA. If the BHA does slide and in rotation the Build Rate can be different. The Build Rate can be the combination of the two drilling modes, sliding and rotary drilling. The system can combine the two, the Build Rate in rotary and the Build Rate in sliding.

Some experts in the industry focus on sliding for wellbore quality control to achieve a consistent build rate for a smooth curve. Other experts believe that rotating should be maximized because the rate of penetration will be lower when the BHA is sliding. By focusing on rotating the BHA may create a tortuosity in the resulting borehole.

In various embodiments, the system can allow the operator to elect to focus on sliding. If the operator desires to preserve the wellbore quality, the BHA will need to slow down rate of penetration resulting an increased time to target. In various embodiments, the system can allow the operator to elect to focus on rotatory drilling. The selection to maximize sliding or to maximize rotating can be factored into the BHA determination.

Each survey can define a point in the well trajectory that could be characterized by three values, a measured depth $s_i$, an inclination $I_i$, and an azimuth $A_i$. When drilling between two surveys, any sequence of slide and rotary drilling can be possible. For the mathematical development, the drilling process can start with sliding, then rotating. The initial survey can be denoted by the index 1. The intermediate point (after the sliding phase) can be denoted with the index 2. Finally, the final survey (after the rotating phase) can be denoted with the index 3.

Given 3 points $(s_i, I_i, A_i)$ for i=1, 2, 3 (MD, Inclination, Azimuth);

$$BR = \frac{I_3 - I_1}{s_3 - s_1}; \quad TR = \frac{A_3 - A_1}{s_3 - s_1}$$

$$BR_1 = \frac{I_2 - I_1}{s_2 - s_1}; \quad TR_1 = \frac{A_2 - A_1}{s_2 - s_1}$$

$$BR_2 = \frac{I_3 - I_2}{s_3 - s_2}; \quad TR_2 = \frac{A_3 - A_2}{s_3 - s_2}$$

With $$X_1 = \frac{s_2 - s_1}{s_3 - s_1}$$

and $$X_2 = \frac{s_3 - s_2}{s_3 - s_1} = 1 - X_1$$

we get $$BR = X_1 BR_1 + (1 - X_1) BR_2; \quad TR = X_1 TR_1 + (1 - X_1) TR_2$$

Assume sliding from 1 to 2 and Rotating from 2 to 3:

$$BR = X_s BR_s + (1 - X_s) BR_r; \quad TR = X_s TR_s + (1 - X_s) TR_r$$

Figure 16:
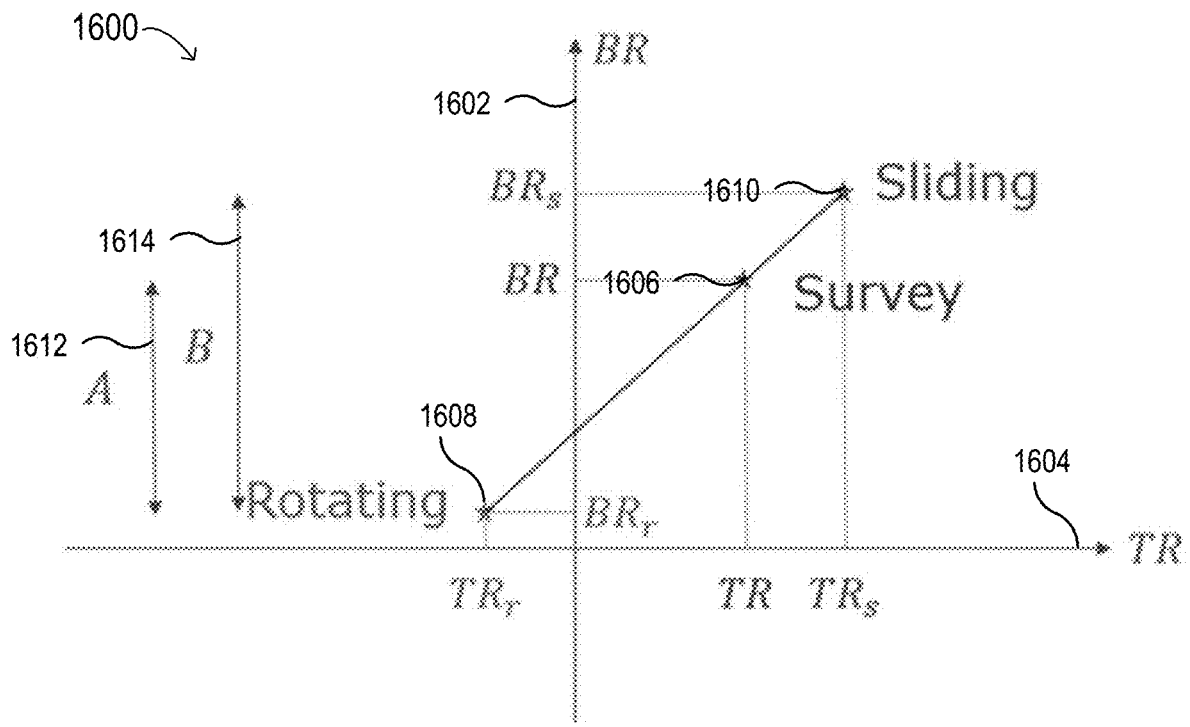
FIG. 16 illustrates a plot of build rate versus turn rate.

FIG. 16 illustrates a plot 1600 of build rate 1602 versus turn rate 1604. A survey point (BR, TR) 1606, a rotating point (BRr, TRr) 1608, a sliding point (BRs, TRs) 1610. The survey point 1606 can be inside the segment [(BRr, TRr)

(BRs, TRs)] which is bound between the rotating point 1608 and the sliding point 1610. The value A 1612 can represent the difference of the build rate 1602 between the rotating point 1608 and the survey point 1606. The value B 1614 can represent the difference of the build rate 1602 between the rotating point 1608 and the sliding point 1610.

Figure 17:
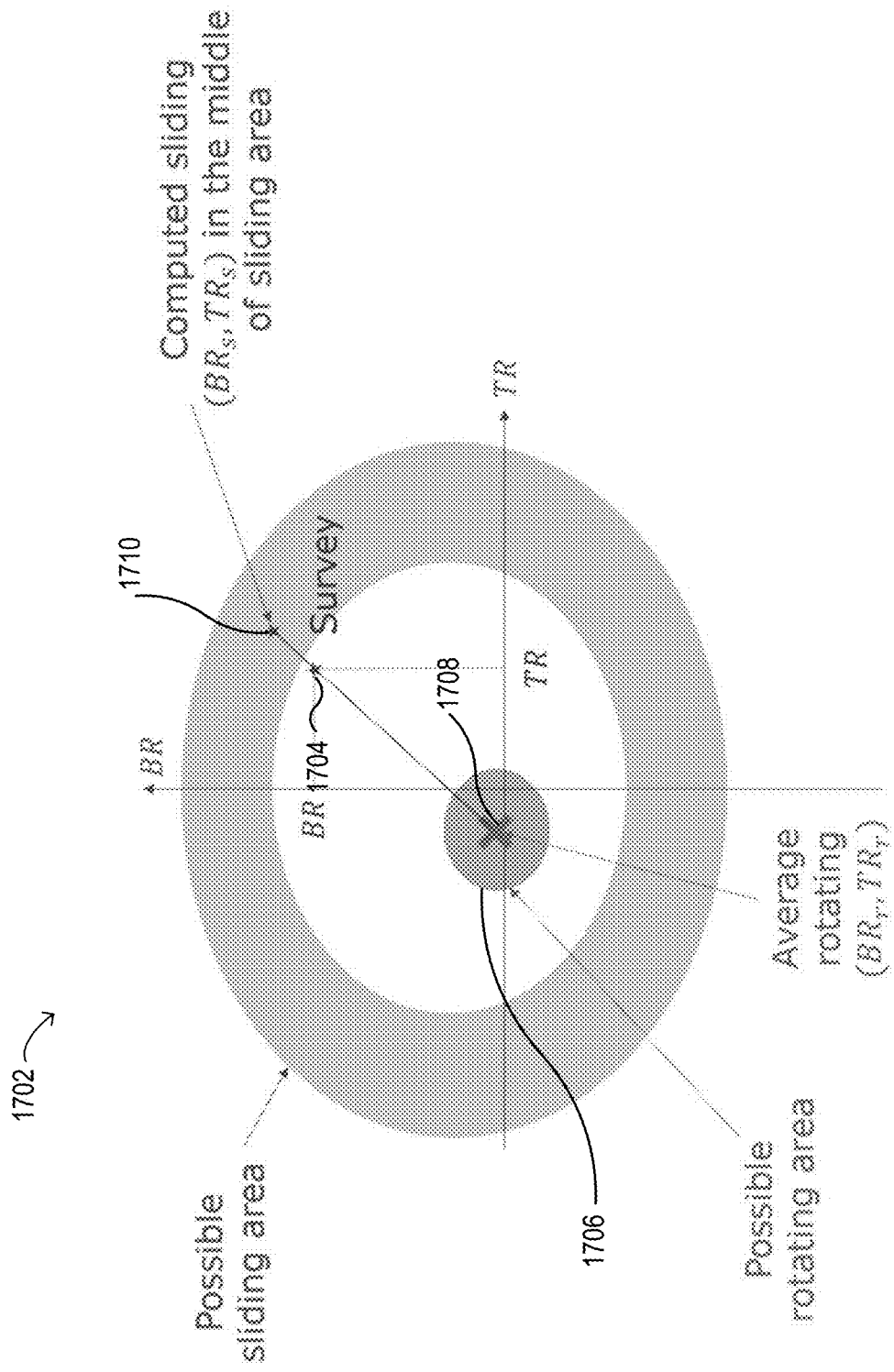
FIG. 17 illustrates an exemplary survey for calculating a sliding ratio score.

FIG. 17 illustrates an exemplary plot 1702 for calculating a sliding ratio score for a BHA. The sliding ratio score can be estimated based on the desired data points and both the rotating and sliding pre-analysis results. As shown in FIG. 17, assuming that the BHA rotates with the average of the rotating results, sliding build and turn rates can be determined for each data point. From that, a sliding ratio can be computed. The total sliding ratio of the section can be obtained as the total sliding length divided by the total length of all drillable segments. It should be noted that the data points shown in the various plots for the scoring of the BHA can be provided based on measurement while drilling information, such as may be obtained at various survey stations or points along the wellbore. It is also to be noted that the location of a BHA can be determined between survey stations by a variety of methods, and such locations can also be used for the data points.

FIG. 17 illustrates an envelope 1702 of the possible sliding area. FIG. 17 illustrates a point 1704 that is a point on a BR and TR plot. A possible rotating area 1706 is also illustrated. An average rotating point 1708 can also be illustrated. The techniques can be used to calculate a computing sliding point 1710 based on a build rate for sliding and a Turn Rate for sliding as illustrated in the middle of the sliding envelope 1702. For each point, the system and method can assume that the order of drilling operations is sliding then rotating. From the computed X_s and build rate rotating ($BR_r$), turn rate rotating ($TR_r$), build rate sliding ($BR_s$), and turn rate sliding ($TR_s$), the system can deduce the intermediate point ($s_2$, $I_2$, $A_2$) and then compute dog leg severity (DLS) and tool face orientation (TFO) for sliding and rotating. The system can average the build rate and turn rate over "drillable" survey stations to determine an optimum BHA for drilling.

The overall BHA score can be a combination of the three scores explained above. When examining the vertical or lateral section, the system determines if the BHA has a good neutral capability and can aim to minimize the sliding ratio. Thus, the overall score for each BHA can be computed as the product of the neutral score by the rotating ratio (1-sliding ratio). When regarding the curve section, the system can focus on the steering capacity and maximizing the sliding ratio to get a smooth curve. In this case, the overall score can be computed as the product of the steering capacity score by the sliding ratio.

Figure 18:
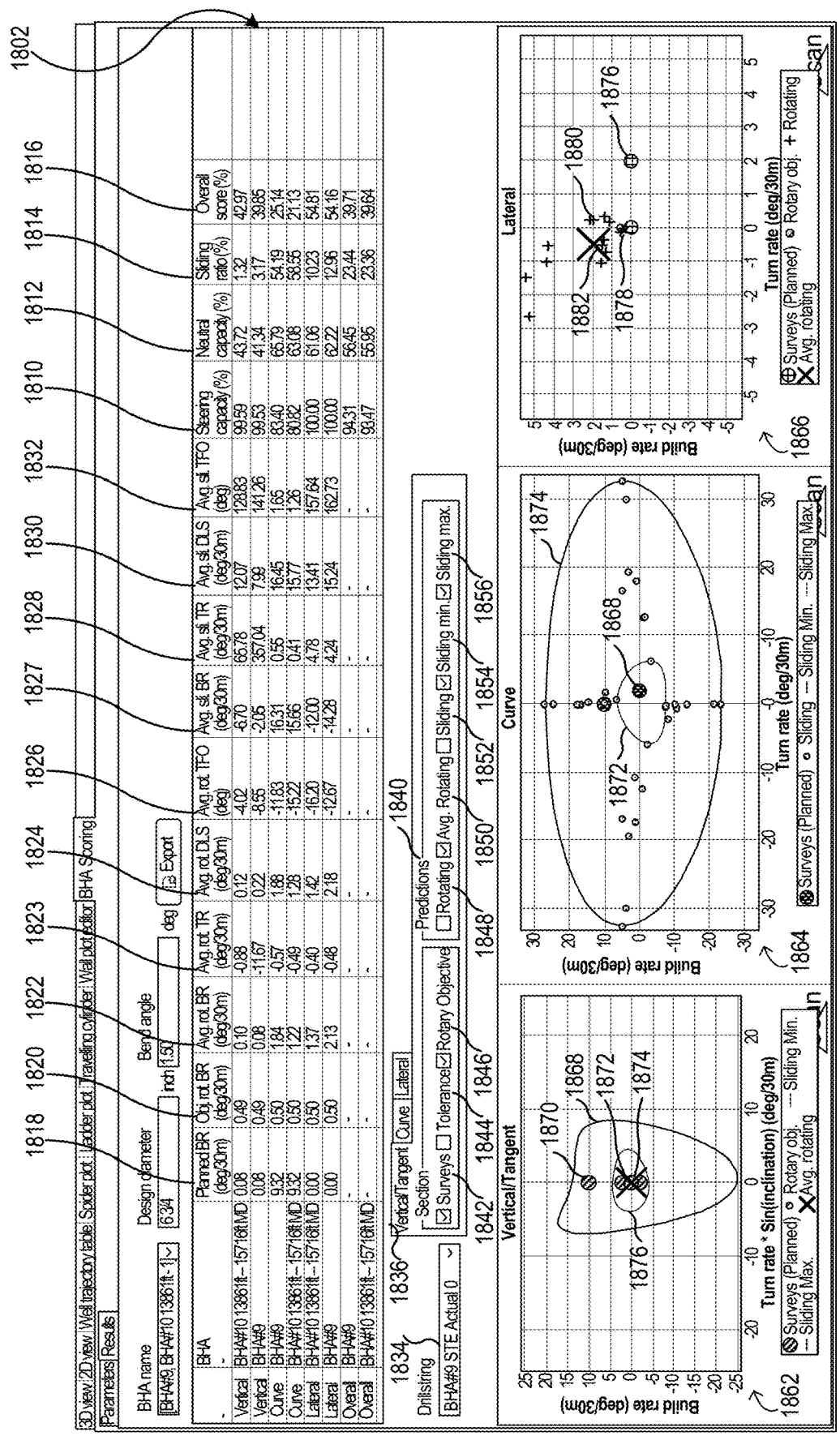
FIG. 18 illustrates a graphical user interface for selecting a bottom hole assembly.

FIG. 18 illustrates an exemplary graphical user interface 1800 for a computer system useful for scoring and selecting a BHA. In various embodiments, the results for BHA calculations can be displayed in a table 1802. The table 1802 can include calculations for one or more exemplary BHAs. The table 1802 can include calculations for a vertical portion 1804, a curved portion 1804, and a lateral portion 1806. The table 1802 can provide overall calculations 1808. The table 1802 can provide calculated values a steering capacity score 1810, a neutral capability score 1812, and a sliding ratio score 1814. The table 1802 can provide an overall score 1816. The steering capacity score 1810 can be used to determine a steering capacity of a BHA. The neutral capability score 1812 can be used to determine a neutral capability of a BHA. The sliding ratio score 1814 can be used to determine a sliding capacity of a BHA. For the vertical or lateral section, the overall score 1816 can be the neutral capability score time 1-sliding ratio. For the curved section, the overall score 1816 can be the steering capacity score times a sliding ratio.

The table 1802 can also provide various other calculated values (e.g., a planned BR (degrees/30 m) 1818, an objective rotating BR (degrees/30 m) 1820, average rotating BR (degrees/30 m) 1822, average rotating turn rate 1823, average rotating dog leg severity (DLS) (degrees/30 m) 1824, average rotating tool face orientation (TFO) (deg) 1826, average sliding BR (degrees/30 m) 1827, average sliding TR (degrees/30 m) 1828, average sliding DLS (degrees/30 m) 1830, average sliding TFO (deg) 1832. The planned BR 1818 can be the average build rate of trajectory. The objective rotating BR 1820 can be an objective rotary build rate of a section. The average rotating BR 1822 can be the average result of rotating build rate. The average rotating turn rate 1823 can be the average result of rotating turn rate. The average rotating DLS 1824 can be the average result of rotating dogleg severity. The average rotating TFO 1826 can be the average result of tool face orientation. The average sliding BR 1827 can be the average result of sliding build rate. The average result of sliding TR 1828 can be the average result of sliding turn rate. The average sliding DLS 1830 can be the average sliding dog leg severity. The average sliding TFO (deg) 1832 can be the average result of tool face orientation.

In various embodiments, the graphical user interface 1800 can include a selection box 1834 to allow an operator to select a particular drill string. The graphical user interface 1800 can present various tabs for configuring build rate/turn rate charts. For example, for a vertical/tangent tab 1836, the graphical user interface 1800 can illustrate options for the display of various sections 1838 and predictions 1840. The sections 1838 can include surveys 1842, tolerance 1844, and rotary objective 1846. The surveys 1842 can be a survey of trajectory of a section. A tolerance 1844 can be the tolerance values around each of the surveys. A rotary objective 1846 can be a rotary objective set for the section. The predictions 1840 can include rotating 1848, average rotating 1850, sliding 1852, sliding minimum 1854, and sliding maximum 1856. The rotating 1848 value can be a rotating prediction. The average rotating 1850 can be an average rotating prediction. The sliding 1852 can be a sliding prediction. The sliding minimum 1854 can be a sliding minimum envelope. The sliding maximum 1856 can be a sliding maximum envelope. These options can be configured separately for each section by default. The curve tab 1858 can include surveys 1842, sliding 1852, sliding minimum 1854, and sliding maximum 1856. The lateral tab 1860 can have surveys 1842, rotary objective 1846, rotating 1848, average rotating 1850.

In various embodiments, the graphical user interface 1800 can include a vertical/tangent chart 1862, a curve chart 1864, a lateral chart 1866. The vertical/tangent chart 1862 can plot a build rate versus a turn rate. The vertical/tangent chart 1862 can illustrate a maximum sliding limit 1868. The vertical/tangent chart 1862 can illustrate planned surveys 1870. The vertical/tangent chart 1862 can illustrate an average rotating point 1872. The vertical/tangent chart 1862 can illustrate a rotary objective 1874. The vertical/tangent chart 1862 can illustrate a sliding minimum value 1876.

The curve chart 1864 can indicate one or more sliding points 1866. The curve chart 1864 can indicate one or more planned surveys 1868. The curve chart 1864 can illustrate one or more sliding projections 1870. The curve chart 1864 can indicate a sliding minimum 1872 and a sliding maximum 1874.

The lateral chart 1866 can illustrate one or more planned surveys 1876. The lateral chart 1866 can illustrate a rotary objective 1878. The lateral chart can illustrate one or more rotating projections 1880. The lateral chart can illustrate and average rotating point 1882. If several BHAs exist, per default, it displays the charts of the "best" BHA (the BHA with the highest overall score of overall section.

Figure 19:
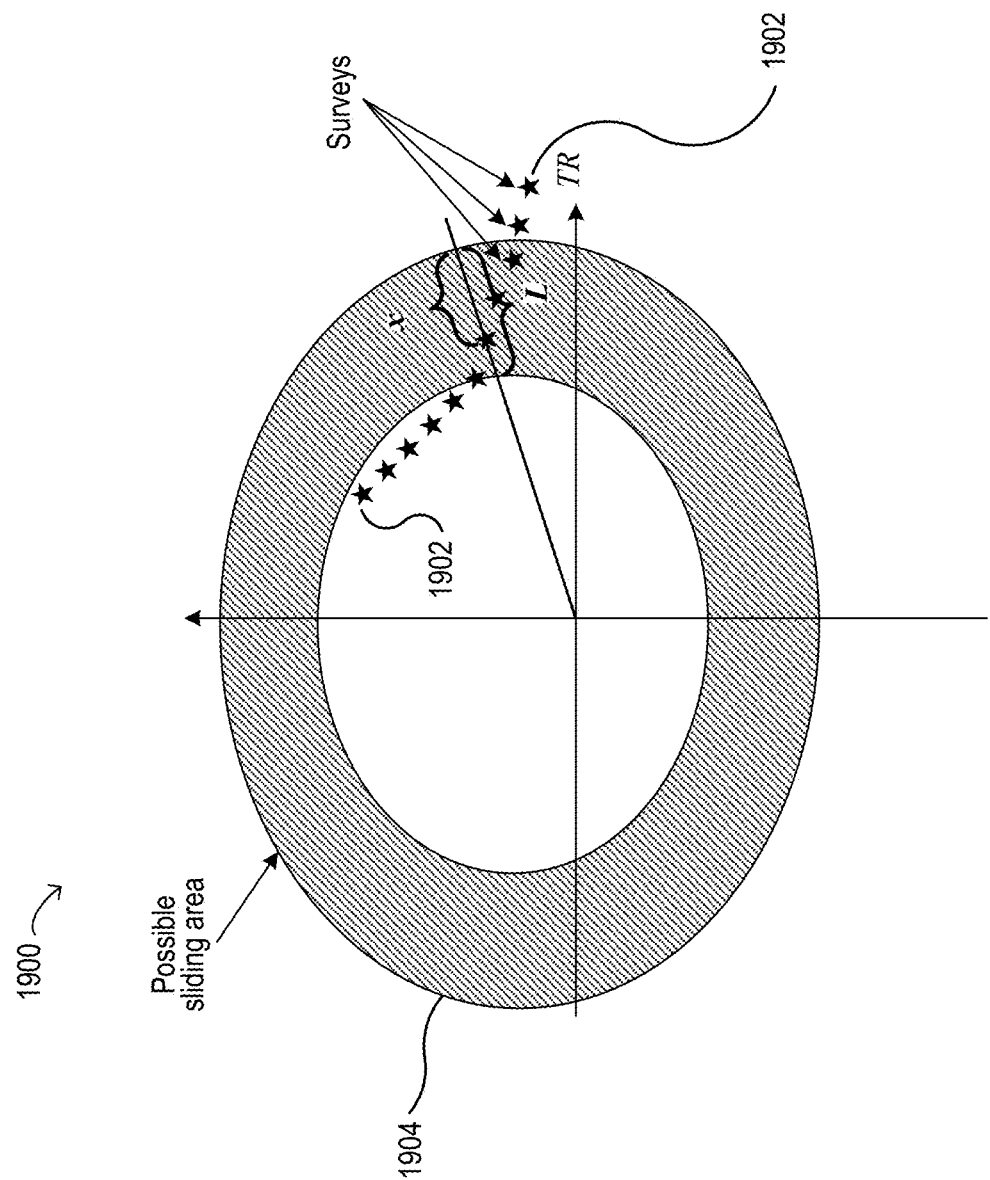
FIG. 19 illustrates a fourth exemplary plot of BR and TR for calculating a steering capacity score.

FIG. 19 illustrates an envelope that can be used to calculate a steering score. FIG. 19 illustrates one or more data points 1902 plotted with respect to an envelope 1904. In various embodiments, the steering score can include a number of survey points 1902 inside the minimum path plus a sum of relative distance to the maximum path for points between a minimum point and a maximum point divided by the total number of points. For example, if the data points 1902 are inside the minimum path, the system can cumulate 1. If the data points 1902 are outside the Max path, the system can assign a value of 0. If the points 1902 are between a minimum and a maximum path, the system can cumulate relative distance to the maximum path (x/L).

Figure 20:
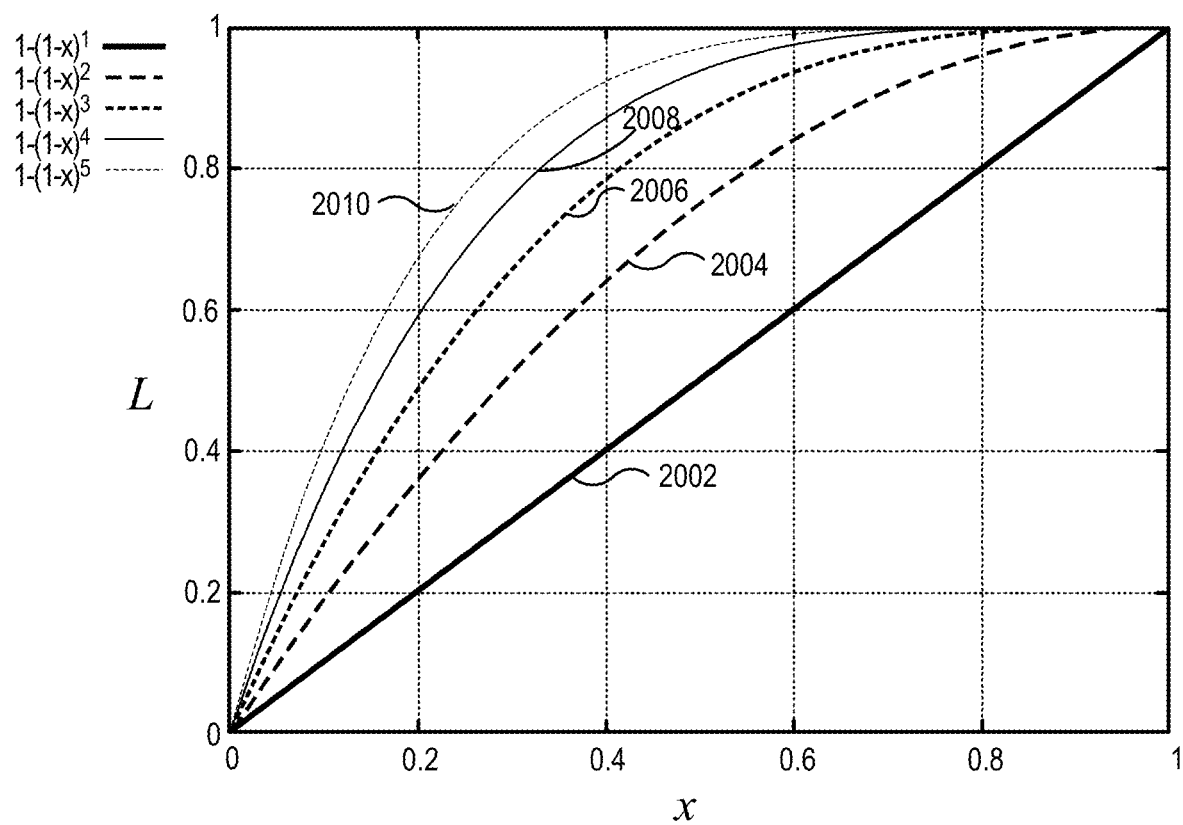
FIG. 20 illustrates a graph for calculating a steering capacity score.

FIG. 20 illustrates a graph for an adjustment that be used for the maximum path. FIG. 20 illustrates a plot of $1-(1-x/L)^n$. In a first curve 2002, x is plotted against $1-(1-x)^1$. In a second curve 2004, x is plotted against $1-(1-x)^2$. In a third curve 2006, x is plotted against $1-(1-x)^3$. In a fourth curve 2008, x is plotted against $1-(1-x)^4$. In a fifth curve 1910, x is plotted against $1-(1-x)^4$. The system can multiply by $x_{min}/x_{max}$ to penalize if the band min-max is too large (e.g., has too much uncertainty).

FIG. 21 illustrates a flowchart for a method for BHA selection. FIG. 21 is a flow chart of a process 2100, according to an example of the present disclosure. According to an example, one or more process blocks of FIG. 21 may be performed by a computer system, including one such as device 1000.

At block 2105, process 2100 may include receiving, by a computing device, a drill plan for the borehole, the drill plan may include formation information for one or more sections of the borehole as well as a trajectory for the wellbore and its geometry. For example, device 1000 may receive, by a computing device, a drill plan for the borehole, the drill plan may include formation information for one or more sections of the borehole, as described above, and the trajectory for the planned borehole.

At block 2110, process 2100 may include accessing, by the computing device, data corresponding to each of a plurality of BHAs. The data for the BHAs may come from a BHA database or another source. The BHA data may include, for each of a plurality of BHAs to be considered: a neutral capability score responsive to the rotary drilling data for the BHA; a steering capacity score responsive to data for a dogleg capability of the BHA; and a sliding ratio score responsive to data for rotary and slide drilling by the BHA. For example, device 1000 may access, by the computing device, data corresponding to each of a plurality of BHAs may include: a neutral capability score responsive to the rotary drilling data for the BHA; a steering capacity score responsive to data for a dogleg capability of the BHA; and a sliding ratio score responsive to data for rotary and slide drilling by the BHA, as described above.

In various embodiments, the neutral capability score for each BHA may be determined by: plotting a plurality of points of a built rate versus a turn rate for a particular BHA of the BHAs; determining a rotary objective with a pre-defined tolerance based on the drillplan or well plan; and determining a percentage of a number of points of the plurality of points that are within the rotary objective as compared to a total number of points, where the neutral capability score may include the determined percentage.

In various embodiments, the steering score for each BHA is determined by plotting a plurality of points of a built rate versus a turn rate for a particular BHA of the BHAs; determining a dogleg objective for a target wellbore for the drillplan; and determining a percentage of a number of points of the plurality of points that are within the dogleg objective as compared to a total number of points, where the steering score may include the determined percentage.

In various embodiments, the steering score is adjusted by a width of a sliding envelope.

In various embodiments, the sliding ratio score for each BHA is determining by: plotting a plurality of points of a built rate versus a turn rate for a particular BHA of the BHAs; determining a sliding area objective for a target wellbore for the drillplan; and determining a percentage of a number of points of the plurality of points that are within the sliding area objective as compared to a total number of points, where the sliding ratio score may include the determined percentage.

At block 2115, process 2100 may include determining, by the computing device, an overall score for each of the BHAs based at least in part on the neutral capability score, the steering capacity score, and the sliding ratio score. For example, device 1000 may determine, by the computing device, an overall score for each of the BHAs based at least in part on the neutral capability score, the steering capacity score, and the sliding ratio score, as described above.

At block 2120, process 2100 may include determining, by the computing device, a select bottom hole assembly of the one or more bottom hole assemblies based at least in part on the overall score. For example, device 1000 may determine, by the computing device, a select bottom hole assembly of the one or more bottom hole assemblies based at least in part on the overall score, as described above.

At block 2125, process 2100 may include displaying the overall BHA score and an identification of the selected BHA. For example, device 1000 may display the overall score and an identification of the selected BHA, as described above. It is to be noted that the computer system may also display or illustrate the scores for a plurality of BHAs and an identification of the corresponding BHAs, and such scores may include the overall score for each of the plurality of BHAs as well as the sub-scores for neutral capability, sliding ratio, and steering capability.

Process 2100 may include additional implementations, such as any single implementation or any combination of implementations described below and/or in connection with one or more other processes described elsewhere herein.

In various embodiments, the sliding ratio score may include a total sliding length divided by a total length of all drillable surveys in the plurality of data.

In various embodiments, the overall score for a vertical section or a lateral section of the borehole for the selected bottom hole assembly may include a product of the neutral score and a rotating ration, the rotating ratio may include one minus the sliding ratio score.

In various embodiments, the overall score for a curve section of the borehole for the selected bottom hole assembly may include a product of the steering capacity score and the sliding ratio score.

In various embodiments, the data is generated by simulated drilling operations.

In various embodiments, the data is generated by actual drilling operations.

In a tenth implementation, alone or in combination with one or more of the first through ninth implementations, the data is a combination of simulated drilling operations data and actual drilling operations data.

In various embodiments, process 2100 may include drilling a borehole using the selected BHA.

In various embodiments, process 2100 further includes selecting a first BHA for a vertical portion of the wellbore; selecting a second BHA for a curved portion of the wellbore; and selecting a third BHA for a lateral portion of the wellbore.

In various embodiments, process 2100 further includes drilling a borehole using the selected BHA; tripping out a drillstring from the borehole; selecting a second BHA for drilling the borehole; replacing the selected BHA with the second BHA on the drillstring; and drilling the borehole using the second BHA.

It should be noted that while FIG. 21 shows example blocks of process 2100, in some implementations, process 2100 may include additional blocks, fewer blocks, different blocks, or differently arranged blocks than those depicted in FIG. 21. Additionally, or alternatively, two or more of the blocks of process 2100 may be performed in parallel.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A method for selecting a bottom hole assembly (BHA) to drill a borehole, the method comprising: receiving, by a computing device, a drill plan for a borehole, the drill plan comprising formation information for one or more sections of the borehole; accessing, by the computing device, data corresponding to each of a plurality of bottom hole assemblies (BHAs) comprising: a neutral capability score responsive to the rotary drilling data for each BHA; a steering capability score responsive to data for a dogleg capability of each BHA; and a sliding ratio score responsive to data for rotary and slide drilling by each BHA; determining, by the computing device, an overall score for each of the plurality of BHAs based at least in part on the neutral capability score, the steering capacity score, and the sliding ratio score; selecting, by the computing device, a BHA from the plurality of BHAs based at least in part on the overall score; displaying the overall score and an identification of the selected BHA; and drilling at least a portion of the wellbore with the selected BHA.

Illustration 2. The method of any preceding or subsequent illustrations or combination of illustrations, wherein the neutral capability score is determined by: plotting, by the computing device, a plurality of points of a built rate versus a turn rate for a particular BHA of the BHAs; determining, by the computing device, a rotary objective with a predefined tolerance based on the drillplan; and determining, by the computing device, a percentage of a number of points of the plurality of points that are within the rotary objective as compared to a total number of points, wherein the neutral capability score comprises the determined percentage.

Illustration 3. The method of any preceding or subsequent illustrations or combination of illustrations, wherein the steering score is determined by: plotting, by the computing device, a plurality of points of a built rate versus a turn rate for each BHA of the BHAs; determining, by the computing device, a dogleg objective for a target wellbore for the drillplan; and determining, by the computing device, a percentage of a number of points of the plurality of points that are within the dogleg objective as compared to a total number of points, wherein the steering score comprises the determined percentage.

Illustration 4. The method of any preceding or subsequent illustrations or combination of illustrations, wherein the steering score is adjusted by a width of a sliding envelope.

Illustration 5. The method of any preceding or subsequent illustrations or combination of illustrations, wherein the sliding ratio score is determined by: plotting, by the computing device, a plurality of points of a built rate versus a turn rate for a particular BHA of the BHAs; determining, by the computing device, a sliding area objective for a target wellbore for the drillplan; and determining, by the computing device, a percentage of a number of points of the plurality of points that are within the sliding area objective as compared to a total number of points, wherein the sliding ratio score comprises the determined percentage.

Illustration 6. The method of any preceding or subsequent illustrations or combination of illustrations, wherein the sliding ratio score comprises a total sliding length divided by a total length of all drillable surveys in the plurality of data.

Illustration 7. The method of any preceding or subsequent illustrations or combination of illustrations, wherein the overall score for a vertical section or a lateral section of the borehole for the selected BHA comprises a product of the neutral score and a rotating ration, the rotating ratio comprising one minus the sliding ratio score.

Illustration 8. The method of any preceding or subsequent illustrations or combination of illustrations, wherein the overall score for a curve section of the borehole for the selected BHA comprises a product of the steering capability score and the sliding ratio score.

Illustration 9. The method of any preceding or subsequent illustrations or combination of illustrations, wherein the data is generated by simulated drilling operations.

Illustration 10. The method of any preceding or subsequent illustrations or combination of illustrations, wherein the data is generated by actual drilling operations.

Illustration 11. The method of any preceding or subsequent illustrations or combination of illustrations, wherein the data is a combination of simulated drilling operations data and actual drilling operations data.

Illustration 12. The method of any preceding or subsequent illustrations or combination of illustrations, further comprising selecting, by the computing device, a first BHA for a vertical portion of the wellbore; selecting, by the computing device, a second BHA for a curved portion of the wellbore; and selecting, by the computing device, a third BHA for a lateral portion of the wellbore.

Illustration 13. The method of any preceding or subsequent illustrations or combination of illustrations, further comprising drilling a borehole using the selected BHA; tripping out a drillstring from the borehole; selecting a second BHA for drilling the borehole; replacing the selected BHA with the second BHA on the drillstring; and drilling the borehole using the second BHA.

Illustration 14. A system for selecting a bottom hole assembly to drill a borehole comprising: one or more processors configured to: receive, by a computing device, a drill plan for the borehole, the drill plan comprising formation information for one or more sections of the borehole; access, by the computing device, data corresponding to each of a plurality of bottom hole assemblies (BHAs) comprising: a neutral capability score responsive to the rotary drilling data for the BHA; a steering capacity score responsive to data for a dogleg capability of the BHA; and a sliding ratio score responsive to data for rotary and slide drilling by the BHA; determine, by the computing device, an overall score for each of the BHAs based at least in part on the neutral capability score, the steering capacity score, and the sliding ratio score; determine, by the computing device, a select bottom hole assembly of the one or more bottom hole assemblies based at least in part on the overall score; and display the overall score and an identification of the select BHA.

Illustration 15. The system of any preceding or subsequent illustrations or combination of illustrations, wherein the neutral capability score is determined by: plotting a plurality of points of a built rate versus a turn rate for a particular BHA of the BHAs; determining a rotary objective with a predefined tolerance based on the drillplan; and determining a percentage of a number of points of the plurality of points that are within the rotary objective as compared to a total number of points, wherein the neutral capability score comprises the determined percentage.

Illustration 16. The system of any preceding or subsequent illustrations or combination of illustrations, wherein the steering score is determined by: plotting a plurality of points of a built rate versus a turn rate for a particular BHA of the BHAs; determining a dogleg objective for a target wellbore for the drillplan; and determining a percentage of a number of points of the plurality of points that are within the dogleg objective as compared to a total number of points, wherein the steering score comprises the determined percentage.

Illustration 17. The system of any preceding or subsequent illustrations or combination of illustrations, wherein the steering score is adjusted by a width of a sliding envelope.

Illustration 18. The system of any preceding or subsequent illustrations or combination of illustrations, wherein the sliding ratio score is determining by: plotting a plurality of points of a built rate versus a turn rate for a particular BHA of the BHAs; determining a sliding area objective for a target wellbore for the drillplan; and determining a percentage of a number of points of the plurality of points that are within the sliding area objective as compared to a total number of points, wherein the sliding ratio score comprises the determined percentage.

Illustration 19. The system of any preceding or subsequent illustrations or combination of illustrations, wherein the sliding ratio score comprises a total sliding length divided by a total length of all drillable surveys in the plurality of data.

Illustration 20. The system of any preceding or subsequent illustrations or combination of illustrations, wherein the overall score for a vertical section or a lateral section of the borehole for the selected bottom hole assembly comprises a product of the neutral score and a rotating ration, the rotating ratio comprising one minus the sliding ratio score.

Illustration 21. The system of any preceding or subsequent illustrations or combination of illustrations, wherein the overall score for a curve section of the borehole for the selected bottom hole assembly comprises a product of the steering capacity score and the sliding ratio score.

Illustration 22. The system of any preceding or subsequent illustrations or combination of illustrations, wherein the data is generated by simulated drilling operations.

Illustration 23. The system of any preceding or subsequent illustrations or combination of illustrations, wherein the data is generated by actual drilling operations.

Illustration 24. The system of any preceding or subsequent illustrations or combination of illustrations, wherein the data is a combination of simulated drilling operations data and actual drilling operations data.

Illustration 25. The system of any preceding or subsequent illustrations or combination of illustrations, further comprising drilling a borehole using the selected BHA.

Illustration 26. The system of any preceding or subsequent illustrations or combination of illustrations, further comprising selecting a first BHA for a vertical portion of the wellbore; selecting a second BHA for a curved portion of the wellbore; and selecting a third BHA for a lateral portion of the wellbore.

Illustration 27. A non-transitory computer-readable medium storing a set of instructions for selecting a bottom hole assembly (BHA) to drill a borehole, the set of instructions comprising: one or more instructions that, when executed by one or more processors of a device, cause the device to: receive, by a computing device, a drill plan for the borehole, the drill plan comprising formation information for one or more sections of the borehole; access, by the computing device, data corresponding to each of a plurality of BHAs comprising: a neutral capability score responsive to the rotary drill data for the BHA; a steer capacity score responsive to data for a dogleg capability of the BHA; and a slide ratio score responsive to data for rotary and slide drilling by the BHA; determine, by the computing device, an overall score for each of the BHAs based at least in part on the neutral capability score, the steering capacity score, and the sliding ratio score; determine, by the computing device, a select bottom hole assembly of the one or more bottom hole assemblies based at least in part on the overall score; and display the overall score and an identification of the select BHA.

Illustration 28. The non-transitory computer-readable medium of any preceding or subsequent illustrations or combination of illustrations, wherein the neutral capability score is determined by: plotting a plurality of points of a built rate versus a turn rate for a particular BHA of the BHAs; determining a rotary objective with a predefined tolerance based on the drillplan; and determining a percentage of a number of points of the plurality of points that are within the rotary objective as compared to a total number of points, wherein the neutral capability score comprises the determined percentage.

Illustration 29. The non-transitory computer-readable medium of any preceding or subsequent illustrations or combination of illustrations, wherein the neutral capability score comprises the determined percentage.

Illustration 30. The method of any preceding or subsequent illustrations or combination of illustrations, wherein the steering score is determined by: plotting a plurality of points of a built rate versus a turn rate for a particular BHA of the BHAs; determining a dogleg objective for a target wellbore for the drillplan; and determining a percentage of a number of points of the plurality of points that are within the dogleg objective as compared to a total number of points, wherein the steering score comprises the determined percentage.

Illustration 31. The non-transitory computer-readable medium of any preceding or subsequent illustrations or combination of illustrations, wherein the steering score is adjusted by a width of a sliding envelope.

Illustration 32. The non-transitory computer-readable medium of any preceding or subsequent illustrations or combination of illustrations, wherein the sliding ratio score is determining by: plotting a plurality of points of a built rate versus a turn rate for a particular BHA of the BHAs determining a sliding area objective for a target wellbore for the drillplan; and determining a percentage of a number of points of the plurality of points that are within the sliding area objective as compared to a total number of points, wherein the sliding ratio score comprises the determined percentage.

Illustration 33. The non-transitory computer-readable medium of any preceding or subsequent illustrations or combination of illustrations, wherein the sliding ratio score comprises a total sliding length divided by a total length of all drillable surveys in the plurality of data.

Illustration 34. The non-transitory computer-readable medium of any preceding or subsequent illustrations or combination of illustrations, wherein the overall score for a vertical section or a lateral section of the borehole for the selected bottom hole assembly comprises a product of the neutral score and a rotating ration, the rotating ratio comprising one minus the sliding ratio score.

Illustration 35. The non-transitory computer-readable medium of any preceding or subsequent illustrations or combination of illustrations, wherein the overall score for a curve section of the borehole for the selected bottom hole assembly comprises a product of the steering capacity score and the sliding ratio score.

Illustration 36. The non-transitory computer-readable medium of any preceding or subsequent illustrations or combination of illustrations, wherein the data is generated by simulated drilling operations.

Illustration 37. The non-transitory computer-readable medium of any preceding or subsequent illustrations or combination of illustrations, wherein the data is generated by actual drilling operations.

Illustration 38. The non-transitory computer-readable medium of any preceding or subsequent illustrations or combination of illustrations, wherein the data is a combination of simulated drilling operations data and actual drilling operations data.

Illustration 39. The non-transitory computer-readable medium of any preceding or subsequent illustrations or combination of illustrations, further comprising drilling a borehole using the selected BHA.

Illustration 40. The non-transitory computer-readable medium of any preceding or subsequent illustrations or combination of illustrations, further comprising selecting a first BHA for a vertical portion of the wellbore; selecting a second BHA for a curved portion of the wellbore; and selecting a third BHA for a lateral portion of the wellbore.

It is to be noted that the foregoing description is not intended to limit the scope of the claims. For example, it is noted that the disclosed methods and systems include additional features and can use additional drilling parameters and relationships beyond the examples provided. The examples and illustrations provided in the present disclosure are for explanatory purposes and should not be considered as limiting the scope of the invention, which is defined only by the following claims.

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. In the figures and the description, like numerals are intended to represent like elements. As used herein, the meaning of "a," "an," and "the" includes singular and plural references unless the context clearly dictates otherwise.

The above-described aspects are merely possible examples of implementations, merely set forth for a clear understanding of the principles of the present disclosure. Many variations and modifications may be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

What is claimed is:

1. A method for selecting a bottom hole assembly (BHA) to drill a borehole, the method comprising:
    receiving, by a computing device, a drill plan for a borehole, the drill plan comprising formation information for one or more sections of the borehole;
    accessing, by the computing device, data corresponding to each of a plurality of bottom hole assemblies (BHAs) comprising:
        a neutral capability score responsive to rotary drilling data for each BHA;
        a steering capability score responsive to data for a dogleg capability of each BHA; and
        a sliding ratio score responsive to data for rotary and slide drilling by each BHA;
    determining, by the computing device, an overall score for each of the plurality of BHAs based at least in part on the neutral capability score, the steering capacity score, and the sliding ratio score;
    selecting, by the computing device, a BHA from the plurality of BHAs based at least in part on the overall score;
    displaying the overall score and an identification of the selected BHA;
    drilling at least a portion of the borehole with the selected BHA;
    selecting a second BHA for drilling the borehole;
    drilling the borehole using at least one of the selected BHA or the second BHA;
    tripping out a drillstring from the borehole;
    replacing the selected BHA with the second BHA on the drillstring or the second BHA with the selected BHA on the drillstring; and
    drilling the borehole using the other of the second BHA or the selected BHA.

2. The method of claim 1, wherein the neutral capability score is determined by:

plotting, by the computing device, a plurality of points of a built rate versus a turn rate for a particular BHA of the BHAs;

determining, by the computing device, a rotary objective with a predefined tolerance based on the drillplan; and determining, by the computing device, a percentage of a number of points of the plurality of points that are within the rotary objective as compared to a total number of points, wherein the neutral capability score comprises the determined percentage.

3. The method of claim 1, wherein the steering score is determined by:

plotting, by the computing device, a plurality of points of a built rate versus a turn rate for each BHA of the BHAs;

determining, by the computing device, a dogleg objective for a target wellbore for the drillplan; and determining, by the computing device, a percentage of a number of points of the plurality of points that are within the dogleg objective as compared to a total number of points, wherein the steering score comprises the determined percentage.

4. The method of claim 1, wherein the steering score is adjusted by a width of a sliding envelope.

5. The method of claim 1, wherein the sliding ratio score is determined by:

plotting, by the computing device, a plurality of points of a built rate versus a turn rate for a particular BHA of the BHAs;

determining, by the computing device, a sliding area objective for a target wellbore for the drillplan; and determining, by the computing device, a percentage of a number of points of the plurality of points that are within the sliding area objective as compared to a total number of points, wherein the sliding ratio score comprises the determined percentage.

6. The method of claim 1, wherein the sliding ratio score comprises a total sliding length divided by a total length of all drillable surveys in the plurality of data.

7. The method of claim 1, wherein the overall score for a vertical section or a lateral section of the borehole for the selected BHA comprises a product of the neutral score and a ratating ratio, the rotating ratio comprising one minus the sliding ratio score.

8. The method of claim 1, wherein the overall score for a curve section of the borehole for the selected BHA comprises a product of the steering capability score and the sliding ratio score.

9. The method of claim 1, wherein the data is generated by simulated drilling operations, actual drilling operations, or a combination of simulated drilling operations data and actual drilling operations data.

10. The method of claim 1, further comprising:

selecting, by the computing device, a first BHA for a vertical portion of the borehole;

selecting, by the computing device, the second BHA for a curved portion of the borehole; and selecting, by the computing device, a third BHA for a lateral portion of the borehole.

11. A system for selecting a bottom hole assembly to drill a borehole comprising:

one or more processors configured to:

receive, by a computing device, a drill plan for the borehole, the drill plan comprising formation information for one or more sections of the borehole;

access, by the computing device, data corresponding to each of a plurality of bottom hole assemblies (BHAs) comprising:

a neutral capability score responsive to rotary drilling data data for the BHA;

a steering capacity score responsive to data for a dogleg capability of the BHA; and a sliding ratio score responsive to data for rotary and slide drilling by the BHA;

determine, by the computing device, an overall score for each of the BHAs based at least in part on the neutral capability score, the steering capacity score, and the sliding ratio score;

determine, by the computing device, a select bottom hole assembly of the one or more bottom hole assemblies based at least in part on the overall score;

display the overall score and an identification of the select BHA;

cause drilling of at least a portion of a borehole with the selected BHA;

selecting a second BHA for drilling the borehole;

cause drilling of the borehole using at least one of the selected BHA or the second BHA;

cause tripping out a drillstring from the borehole;

cause replacing the selected BHA with the second BHA on the drillstring or the second BHA with the selected BHA on the drillstring; and cause drilling of the borehole using the other of the second BHA or the selected BHA.

12. The system of claim 11, wherein the neutral capability score is determined by:

plotting a plurality of points of a built rate versus a turn rate for a particular BHA of the BHAs;

determining a rotary objective with a predefined tolerance based on the drillplan; and determining a percentage of a number of points of the plurality of points that are within the rotary objective as compared to a total number of points, wherein the neutral capability score comprises the determined percentage.

13. The system of claim 11, wherein the steering score is determined by:

plotting a plurality of points of a built rate versus a turn rate for a particular BHA of the BHAs;

determining a dogleg objective for a target wellbore for the drillplan; and determining a percentage of a number of points of the plurality of points that are within the dogleg objective as compared to a total number of points, wherein the steering score comprises the determined percentage.

14. The system of claim 11, wherein the steering score is adjusted by a width of a sliding envelope.

15. The system of claim 11, wherein the sliding ratio score is determined by:

plotting a plurality of points of a built rate versus a turn rate for a particular BHA of the BHAs;

determining a sliding area objective for a target wellbore for the drillplan; and determining a percentage of a number of points of the plurality of points that are within the sliding area objective as compared to a total number of points, wherein the sliding ratio score comprises the determined percentage.

16. The system of claim 11, wherein the sliding ratio score comprises a total sliding length divided by a total length of all drillable surveys in the plurality of data.

17. The system of claim 11, wherein the overall score for a vertical section or a lateral section of the borehole for the selected bottom hole assembly comprises a product of the neutral score and a rotating ratio, the rotating ratio comprising one minus the sliding ratio score.

18. The system of claim 11, wherein the overall score for a curve section of the borehole for the selected bottom hole assembly comprises a product of the steering capacity score and the sliding ratio score.

19. The system of claim 11, wherein the data is generated by simulated drilling operations, actual drilling operations, or a combination of simulated drilling operations data and actual drilling operations data.

20. A non-transitory computer-readable medium storing a set of instructions for selecting a bottom hole assembly (BHA) to drill a borehole, the set of instructions comprising:
one or more instructions that, when executed by one or more processors of a device, cause the device to:
receive, by a computing device, a drill plan for the borehole, the drill plan comprising formation information for one or more sections of the borehole;
access, by the computing device, data corresponding to each of a plurality of BHAs comprising:
a neutral capability score responsive to rotary drilling data for the BHA;
a steer capacity score responsive to data for a dogleg capability of the BHA; and
a slide ratio score responsive to data for rotary and slide drilling by the BHA;
determine, by the computing device, an overall score for each of the BHAs based at least in part on the neutral capability score, the steering capacity score, and the sliding ratio score;
determine, by the computing device, a select bottom hole assembly of the one or more bottom hole assemblies based at least in part on the overall score;
display the overall score and an identification of the select BHA;
cause drilling of at least a portion of a borehole with the selected BHA;
selecting a second BHA for drilling the borehole;
cause drilling of the borehole using at least one of the selected BHA or the second BHA;
cause tripping out a drillstring from the borehole;
cause replacing the selected BHA with the second BHA on the drillstring or the second BHA with the selected BHA on the drillstring; and
cause drilling of the borehole using the other of the second BHA or the selected BHA.

21. The non-transitory computer-readable medium of claim 20, wherein the neutral capability score is determined by:
plotting a plurality of points of a built rate versus a turn rate for a particular BHA of the BHAs;
determining a rotary objective with a predefined tolerance based on the drillplan; and
determining a percentage of a number of points of the plurality of points that are within the rotary objective as compared to a total number of points, wherein the neutral capability score comprises the determined percentage.

22. The non-transitory computer-readable medium of claim 21, wherein the neutral capability score comprises the determined percentage.

23. The non-transitory computer-readable medium of claim 20, wherein the steering score is determined by:
plotting a plurality of points of a built rate versus a turn rate for a particular BHA of the BHAs;
determining a dogleg objective for a target wellbore for the drillplan; and
determining a percentage of a number of points of the plurality of points that are within the dogleg objective as compared to a total number of points, wherein the steering score comprises the determined percentage.

24. The non-transitory computer-readable medium of claim 23, wherein the steering score is adjusted by a width of a sliding envelope.

25. The non-transitory computer-readable medium of claim 20, wherein the sliding ratio score is determining by:
plotting a plurality of points of a built rate versus a turn rate for a particular BHA of the BHAs
determining a sliding area objective for a target wellbore for the drillplan; and
determining a percentage of a number of points of the plurality of points that are within the sliding area objective as compared to a total number of points, wherein the sliding ratio score comprises the determined percentage.

26. The non-transitory computer-readable medium of claim 20, wherein the sliding ratio score comprises a total sliding length divided by a total length of all drillable surveys in the plurality of data.

27. The non-transitory computer-readable medium of claim 20, wherein the overall score for a vertical section or a lateral section of the borehole for the selected bottom hole assembly comprises a product of the neutral score and a rotating ratio, the rotating ratio comprising one minus the sliding ratio score.

28. The non-transitory computer-readable medium of claim 20, wherein the overall score for a curve section of the borehole for the selected bottom hole assembly comprises a product of the steering capacity score and the sliding ratio score.

29. The non-transitory computer-readable medium of claim 20, wherein the data is generated by simulated drilling operations, actual drilling operations, or a combination of simulated drilling operations data and actual drilling operations data.

30. The non-transitory computer-readable medium of claim 20, further comprising:
selecting a first BHA for a vertical portion of the borehole
selecting the second BHA for a curved portion of the borehole; and
selecting a third BHA for a lateral portion of the borehole.

* * * * *